United States Patent
Ishibashi et al.

(10) Patent No.: US 7,869,337 B2
(45) Date of Patent: Jan. 11, 2011

(54) INFORMATION PROCESSING SYSTEM, INFORMATION PROCESSING APPARATUS AND METHOD, PROGRAM, AND RECORDING MEDIUM

(75) Inventors: Yoshihito Ishibashi, Tokyo (JP); Susumu Kusakabe, Tokyo (JP); Fumio Kubono, Tokyo (JP)

(73) Assignee: Sony Corporation, Tokyo (JP)

( * ) Notice: Subject to any disclaimer, the term of this patent is extended or adjusted under 35 U.S.C. 154(b) by 1324 days.

(21) Appl. No.: 11/390,274

(22) Filed: Mar. 28, 2006

(65) Prior Publication Data

US 2006/0256700 A1 Nov. 16, 2006

(30) Foreign Application Priority Data

Mar. 29, 2005 (JP) ............................. 2005-093515

(51) Int. Cl.
*G11B 3/00* (2006.01)
(52) U.S. Cl. ...................... 369/170; 455/575.1; 370/455
(58) Field of Classification Search .............. 455/575.1; 340/870.16; 369/126; 370/455
See application file for complete search history.

(56) References Cited

U.S. PATENT DOCUMENTS

| | | | |
|---|---|---|---|
| 5,023,597 A | | 6/1991 | Salisbury |
| 5,164,707 A | | 11/1992 | Rasmussen et al. |
| 5,434,842 A | * | 7/1995 | Weiss et al. ................. 369/126 |
| 5,739,746 A | | 4/1998 | Shaffer et al. |
| 5,914,701 A | | 6/1999 | Gersheneld et al. |
| 5,987,438 A | | 11/1999 | Nakano et al. |
| 6,058,477 A | | 5/2000 | Kusakabe et al. |
| 6,195,008 B1 | | 2/2001 | Bader |
| 6,223,018 B1 | | 4/2001 | Fukumoto et al. |
| 6,441,747 B1 | * | 8/2002 | Khair et al. ............. 340/870.16 |
| 6,611,195 B1 | | 8/2003 | Manneschi et al. |
| 6,725,087 B1 | * | 4/2004 | Rubinsky et al. ............. 600/547 |

(Continued)

FOREIGN PATENT DOCUMENTS

CN 1303187 A 7/2001

(Continued)

OTHER PUBLICATIONS

Kiyoaki Takiguchi, "Communication System", Patent Abstracts of Japan, pp. 1 and 2, Oct. 7, 2004, of Japanese Publication No. 2004-282733, Japan.

(Continued)

*Primary Examiner*—Thong H Vu
(74) *Attorney, Agent, or Firm*—Finnegan, Henderson, Farabow, Garrett & Dunner, L.L.P.

(57) ABSTRACT

A user operates a selection panel installed in a shop to select contents which the user wants to review. A reception unit identifies the contents based on the user's operation on the selection panel, acquires an ID of a portable device incorporated in headphones worn by the user, and transmits the ID to a management server. The management server transmits data of the contents to a transmission device, which searches for a signal electrode capable of communicating with the portable device of the user among signal electrodes that are embedded in the floor of the shop. The transmission device transmits a signal representative of the contents from the signal electrode that has been searched for, and the portable device receives the signal transmitted from the transmission device. An audio signal of the contents is output from the headphones.

19 Claims, 21 Drawing Sheets

U.S. PATENT DOCUMENTS

| | | | |
|---|---|---|---|
| 6,897,788 B2 * | 5/2005 | Khair et al. | 340/870.16 |
| 7,152,799 B2 | 12/2006 | Nakabe | |
| 7,184,581 B2 | 2/2007 | Johansen et al. | |
| 7,260,436 B2 | 8/2007 | Kilgore et al. | |
| 7,433,718 B2 * | 10/2008 | Manabe et al. | 455/575.1 |
| 7,693,174 B2 * | 4/2010 | Ishibashi et al. | 370/445 |
| 2002/0065711 A1 | 5/2002 | Fujisawa et al. | |
| 2002/0146032 A1 | 10/2002 | Attimont et al. | |
| 2003/0137989 A1 | 7/2003 | Nagai | |
| 2004/0056811 A1 | 3/2004 | Pakray et al. | |
| 2006/0045118 A1 | 3/2006 | Hyoung et al. | |
| 2006/0077616 A1 | 4/2006 | Takiguchi | |
| 2007/0021077 A1 | 1/2007 | Amtmann et al. | |
| 2007/0221725 A1 | 9/2007 | Kawaguchi | |
| 2007/0222599 A1 | 9/2007 | Coveley et al. | |

FOREIGN PATENT DOCUMENTS

| | | |
|---|---|---|
| EP | 1 100 218 A2 | 5/2001 |
| JP | 7-20249 | 1/1995 |
| JP | 10-229357 | 8/1998 |
| JP | 10-232283 | 9/1998 |
| JP | 11-509380 | 8/1999 |
| JP | 2000-224083 | 8/2000 |
| JP | 2001-134890 | 5/2001 |
| JP | 2001-144662 | 5/2001 |
| JP | 2002-009710 | 1/2002 |
| JP | 2003-063392 | 3/2003 |
| JP | 2003-132031 | 5/2003 |
| JP | 2003-163644 | 6/2003 |
| JP | 2003-317042 | 11/2003 |
| JP | 2004-135075 | 4/2004 |
| JP | 2004-145873 | 5/2004 |
| JP | 2004-214737 | 7/2004 |
| JP | 2004-282733 | 10/2004 |
| JP | 2005-004383 | 1/2005 |

OTHER PUBLICATIONS

Shigeru Tajima, "Signal Transmission System, Signal Transmitter, and Signal Receiver", Patent Abstracts of Japan, pp. 1 and 2, Jun. 6, 2003, of Japanese Publication No. 2003-163644, Japan.

Kaneyuki Doi et al., "Data Transmission System Utilizing Human Body as Signal Transmission Path", Patent Abstracts of Japan, pp. 1 and 2, Jan. 11, 2002, of Japanese Publication No. 2002-009710, Japan.

Haruo Oba et al., "Mobile Audio Listening Device", Patent Abstracts of Japan, pp. 1 and 2, May 25, 2001, of Japanese Publication No. 2001-144662, Japan.

* cited by examiner

FIG. 4

| FREQUENCY f [Hz] | RECEPTION LOAD Rr [Ω] | ELECTROSTATIC CAPACITANCE [F] | EFFECTIVE VOLTAGE Vrrms [V] |
|---|---|---|---|
| 1.0E+06 | 1.0E+04 | 1.0E−13 | 0.013 |
| 1.0E+06 | 1.0E+04 | 1.0E−12 | 0.125 |
| 1.0E+06 | 1.0E+04 | 1.0E−11 | 1.064 |
| 1.0E+06 | 1.0E+05 | 1.0E−13 | 0.125 |
| 1.0E+06 | 1.0E+05 | 1.0E−12 | 1.064 |
| 1.0E+06 | 1.0E+05 | 1.0E−11 | 1.975 |
| 1.0E+06 | 1.0E+06 | 1.0E−13 | 1.064 |
| 1.0E+06 | 1.0E+06 | 1.0E−12 | 1.975 |
| 1.0E+06 | 1.0E+06 | 1.0E−11 | 2.000 |
| 1.0E+07 | 1.0E+04 | 1.0E−13 | 0.125 |
| 1.0E+07 | 1.0E+04 | 1.0E−12 | 1.064 |
| 1.0E+07 | 1.0E+04 | 1.0E−11 | 1.975 |
| 1.0E+07 | 1.0E+05 | 1.0E−13 | 1.064 |
| 1.0E+07 | 1.0E+05 | 1.0E−12 | 1.975 |
| 1.0E+07 | 1.0E+05 | 1.0E−11 | 2.000 |
| 1.0E+07 | 1.0E+06 | 1.0E−13 | 1.975 |
| 1.0E+07 | 1.0E+06 | 1.0E−12 | 2.000 |
| 1.0E+07 | 1.0E+06 | 1.0E−11 | 2.000 |
| 1.0E+08 | 1.0E+04 | 1.0E−13 | 1.064 |
| 1.0E+08 | 1.0E+04 | 1.0E−12 | 1.975 |
| 1.0E+08 | 1.0E+04 | 1.0E−11 | 2.000 |
| 1.0E+08 | 1.0E+05 | 1.0E−13 | 1.975 |
| 1.0E+08 | 1.0E+05 | 1.0E−12 | 2.000 |
| 1.0E+08 | 1.0E+05 | 1.0E−11 | 2.000 |
| 1.0E+08 | 1.0E+06 | 1.0E−13 | 2.000 |
| 1.0E+08 | 1.0E+06 | 1.0E−12 | 2.000 |
| 1.0E+08 | 1.0E+06 | 1.0E−11 | 2.000 |

| DEVICE ID | CONTENTS ID | ELECTRODE ID |
|---|---|---|
| 12345678 | 1001 | A1 |
| 98765432 | 3001 | B2 |
| ⋮ | ⋮ | ⋮ |

INFORMATION PROCESSING SYSTEM, INFORMATION PROCESSING APPARATUS AND METHOD, PROGRAM, AND RECORDING MEDIUM

CROSS REFERENCES TO RELATED APPLICATIONS

The present invention contains subject matter related to Japanese Patent Application JP 2005-093515, filed with the Japanese Patent Office on Mar. 29, 2005, the entire contents of which being incorporated herein by reference.

BACKGROUND OF THE INVENTION

The present invention relates to an information processing system, an apparatus for and a method of processing information, a program, and a recording medium, and more particularly to an information processing system, an apparatus for and a method of processing information, a program, and a recording medium, which are capable of providing a comfortable listening environment with a low-cost and simple arrangement.

In recent years, it has been the general practice in record shops for customers to preview contents such as CDs before buying them. FIG. 1 of the accompanying drawings shows a conventional CD preview system. A user who wishes to preview a CD stands near a preview panel 1 that is installed in a given area in the record shop, and wears headphones 2 connected to the preview panel 1. The panel 1 has a plurality of buttons 11-1, 11-2, 11-3, 11-4, for selecting a CD to be previewed, and a plurality of titles (title 1, title 2, title 3, title 4, ... ) of CDs selected by the respective buttons, the titles being displayed near the buttons (in FIG. 1, on the right sides of the buttons).

If the user presses the button 11-1, then the CD corresponding to the title 1 is selected from a plurality of CDs 4 loaded in the CD preview system and played back. An audio signal reproduced from the CD is transmitted through a cable 3 to the headphones 2, from which reproduced sounds are radiated for the user to preview the CD.

Recent advances in the radio communication technology have resulted in new data transmission and communication proposals. For example, radio transmission systems based on the 2.4 GHz band (so-called Bluetooth) are expected to achieve an exchange of data between devices of different types, e.g., personal computers, peripheral devices, home electric appliances, cellular phones, etc. There has been proposed a technology for performing communications between transmitters and receivers using conductors which are different from ordinary communication mediums, e.g., a human body. For details, reference should be made to JP-A No. Hei 11-509380 and Japanese Patent Laid-open No. Hei 10-229357, for example. Expectations have been raised for a technology for reproducing contents based on such schemes of radio communications.

The conventional CD preview system shown in FIG. 1 is disadvantageous in that since the cable 3 has a limited length, the user needs to keep standing near the preview panel 1 placed in the given area in the record shop, and the number of users who can use the preview panel 1 at the same time is limited. If there are too many users who are desirous of previewing CDs with the CD preview system, then the other users than those who have already been previewing CDs have to wait until the users attending the preview panel 1 finish previewing their CDs. Therefore, the conventional CD preview system is not convenient enough for all users.

Radio communications may be used to eliminate the limitation on the length of the cable 3. According to JP-A No. Hei 11-509380, a signal is transmitted in a closed circuit that is made up of a transmitter, a human body, a receiver, and ground. Electrodes of the transmitter and the receiver which are remote from the human body are so weakly coupled to ground that the closed circuit cannot virtually be established. According to Japanese Patent Laid-open No. Hei 10-229357, a signal is transmitted in a closed circuit that is made up of a transmitter, a human body, a receiver, and atmospheric air. The transmitter and the receiver need to be positioned considerably closely to each other in order for them to be coupled to each other through the atmospheric air.

SUMMARY OF THE INVENTION

It is desirable to provide an information processing system, an apparatus for and a method of processing information, a program, and a recording medium, which are capable of providing a comfortable reviewing environment with a low-cost and simple arrangement.

An information processing system according to the present invention includes a terminal carried by a user, and an information processing device for communicating with the terminal, the information processing device including a first signal electrode for transmitting or receiving a signal through a communication medium in communications with the terminal, a first reference electrode for obtaining a reference point for determining an output value of the signal, an identifying section for identifying data to be transmitted to the terminal, an acquiring section for acquiring information for identifying the terminal, a searching section for searching for the first signal electrode which is capable of communicating with the terminal corresponding to the information acquired by the acquiring section, and a transmitting section for transmitting a signal corresponding to the data identified by the identifying section from the first signal electrode searched for by the searching section to the terminal, the terminal including a second signal electrode for transmitting or receiving a signal through a communication medium in communications with the information processing device, a second reference electrode for obtaining a reference point for determining an output value of the signal, a stored information transmitting section for transmitting information stored therein as a signal to the information processing device, and a receiving section for receiving the signal transmitted from the information processing device.

In the information processing system, the information processing device including transmits or receives a signal through a communication medium to or from the terminal, identifies data to be transmitted to the terminal, acquires information for identifying the terminal, searches for the first signal electrode which is capable of communicating with the terminal corresponding to the information that is acquired, transmits a signal corresponding to the data that is identified from the first signal electrode that is searched for to the terminal. The terminal transmits or receives a signal through a communication medium to or from the information processing device, transmits information stored therein as a signal to the information processing device, and receives the signal transmitted from the information processing device.

A first information processing device according to the present invention is an information processing device for communicating with a terminal carried by a user, including a signal electrode for transmitting or receiving a signal through a communication medium in communications with the terminal, a reference electrode for obtaining a reference point for determining an output value of the signal, an identifying section for identifying data to be transmitted to the terminal, an acquiring section for acquiring information for identifying the terminal, a searching section for searching for the signal electrode which is capable of communicating with the terminal corresponding to the information acquired by the acquiring section, and a transmitting section for transmitting a signal corresponding to the data identified by the identifying section from the signal electrode searched for by the searching section to the terminal.

The signal electrode is electrostatically coupled to the communication medium more intensively than the reference electrode, and transmits or receives a signal corresponding to a potential difference developed between the signal electrode and the reference electrode.

The identifying section searches for a signal electrode capable of communicating with the terminal among a plurality of signal electrodes corresponding to a plurality of data, and identifies the data based on the signal electrode which has been searched for.

The identifying section identifies the data based on a signal transmitted from the terminal.

The signal electrode for communicating with the terminal is mounted on an object corresponding to the data, and the data is identified based on the signal transmitted from the terminal to the identifying section based on the signal transmitted from the signal electrode mounted on the object when the user touches the object corresponding to the data.

The information processing further includes a generating section for generating a table associating the data identified by the identifying section with the information acquired by the acquiring section for identifying the terminal and the signal electrode searched for by the searing section and capable of communicating with the terminal, wherein the transmitting section transmit the signal corresponding to the data based on the table generated by the generating section.

The searching section searches for a signal electrode capable of communicating with the terminal each time a preset time elapses, and the table is updated based on information with respect to the signal electrode which has been searched for.

The data includes audio data as contents, and the terminal is incorporated in headphones worn by the user.

The signal electrode from which the signal corresponding to the data is transmitted to the terminal by the transmitting section is embedded in a floor of a shop for selling the contents, the communication medium includes a human body, and the searching section searches the signal electrode embedded in a position where the user stands, as the signal capable of communicating with the terminal.

The data is encrypted and transmitted to the terminal.

A first method of processing information according to the present invention is a method of processing information in an information processing device having a signal electrode for transmitting or receiving a signal through a communication medium, and a reference electrode for obtaining a reference point for determining an output value of the signal, wherein the information processing device communicates with a terminal carried by a user based on the signal transmitted or received by the signal electrode, the method including the steps of identifying data to be transmitted to the terminal, acquiring information for identifying the terminal, searching for the signal electrode which is capable of communicating with the terminal corresponding to the information acquired in the step of acquiring, and transmitting a signal corresponding to the data identified in the step of identifying from the signal electrode searched for in the step of searching for to the terminal.

A program according to the present invention is a program for controlling an information processing device to process information, the information processing device having a signal electrode for transmitting or receiving a signal through a communication medium, and a reference electrode for obtaining a reference point for determining an output value of the signal, wherein the information processing device communicates with a terminal carried by a user based on the signal transmitted or received by the signal electrode, the program enabling a computer to perform a process including the steps of controlling identification of data to be transmitted to the terminal, controlling acquisition of information for identifying the terminal, controlling searching for of the signal electrode which is capable of communicating with the terminal corresponding to the information acquired in the step of controlling acquisition, and controlling transmission of a signal corresponding to the data identified in the step of controlling identification from the signal electrode searched for in the step of controlling searching for to the terminal.

A first recording medium according to the present invention is a recording medium recording therein a program for controlling an information processing device to process information, the information processing device having a signal electrode for transmitting or receiving a signal through a communication medium, and a reference electrode for obtaining a reference point for determining an output value of the signal, wherein the information processing device communicates with a terminal carried by a user based on the signal transmitted or received by the signal electrode, the program enabling a computer to perform a process including the steps of controlling identification of data to be transmitted to the terminal, controlling acquisition of information for identifying the terminal, controlling searching for of the signal electrode which is capable of communicating with the terminal corresponding to the information acquired in the step of controlling acquisition, and controlling transmission of a signal corresponding to the data identified in the step of controlling identification from the signal electrode searched for in the step of controlling searching for to the terminal.

In the first information processing device, the first method of processing information, and the program according to the present invention, data to be transmitted to a terminal is identified, information for identifying the terminal is acquired, a signal electrode capable of communicating with the terminal corresponding to the acquired information is searched for, and a signal corresponding to the identified data is transmitted from the signal electrode which is searched for to the terminal.

A second information processing device according to the present invention is an information processing device for being carried by a user for communicating with another information processing device, including a signal electrode for transmitting or receiving a signal through a communication medium in communications with the other information processing device, a reference electrode for obtaining a reference point for determining an output value of the signal, a stored information transmitting section for transmitting information stored therein as a signal to the other information processing device, and a receiving section for receiving a signal transmitted from the other information processing device.

The signal electrode is electrostatically coupled to the communication medium more intensively than the reference electrode, and transmits or receives a signal corresponding to a potential difference developed between the signal electrode and the reference electrode.

The communication medium includes a human body, and the information processing device is incorporated in a unit worn by the user.

The receiving section receives a signal corresponding to data of contents transmitted from the other information processing device, and the signal received by the receiving section is output to the unit.

A second method of processing information according to the present invention is a method of processing information in an information processing device carried by a user and having a signal electrode for transmitting or receiving a signal through a communication medium to or from another information device, and a reference electrode for obtaining a reference point for determining an output value of the signal, wherein the information processing device communicates with the other information processing device based on the signal transmitted or received by the signal electrode, the method including the steps of transmitting stored information as a signal to the other information processing device, and receiving a signal transmitted from the other information processing device.

In the second information processing device and the second method of processing information, stored information is transmitted as a signal to the other information processing device, and a signal transmitted from the other information processing device is received.

According to the present invention, there is provided a reviewing environment, particularly, a comfortable reviewing environment, with a low-cost and simple arrangement.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram showing calculated effective values of voltages appearing across a reception load resistor in the equivalent circuit shown in FIG. 3;

DETAILED DESCRIPTION OF THE PREFERRED EMBODIMENTS

Preferred embodiments of the present invention will be described below with reference to the accompanying drawings. First, radio communications that are employed in the present invention will be described in detail below with reference to FIGS. 2 through 9.

Figure 1:
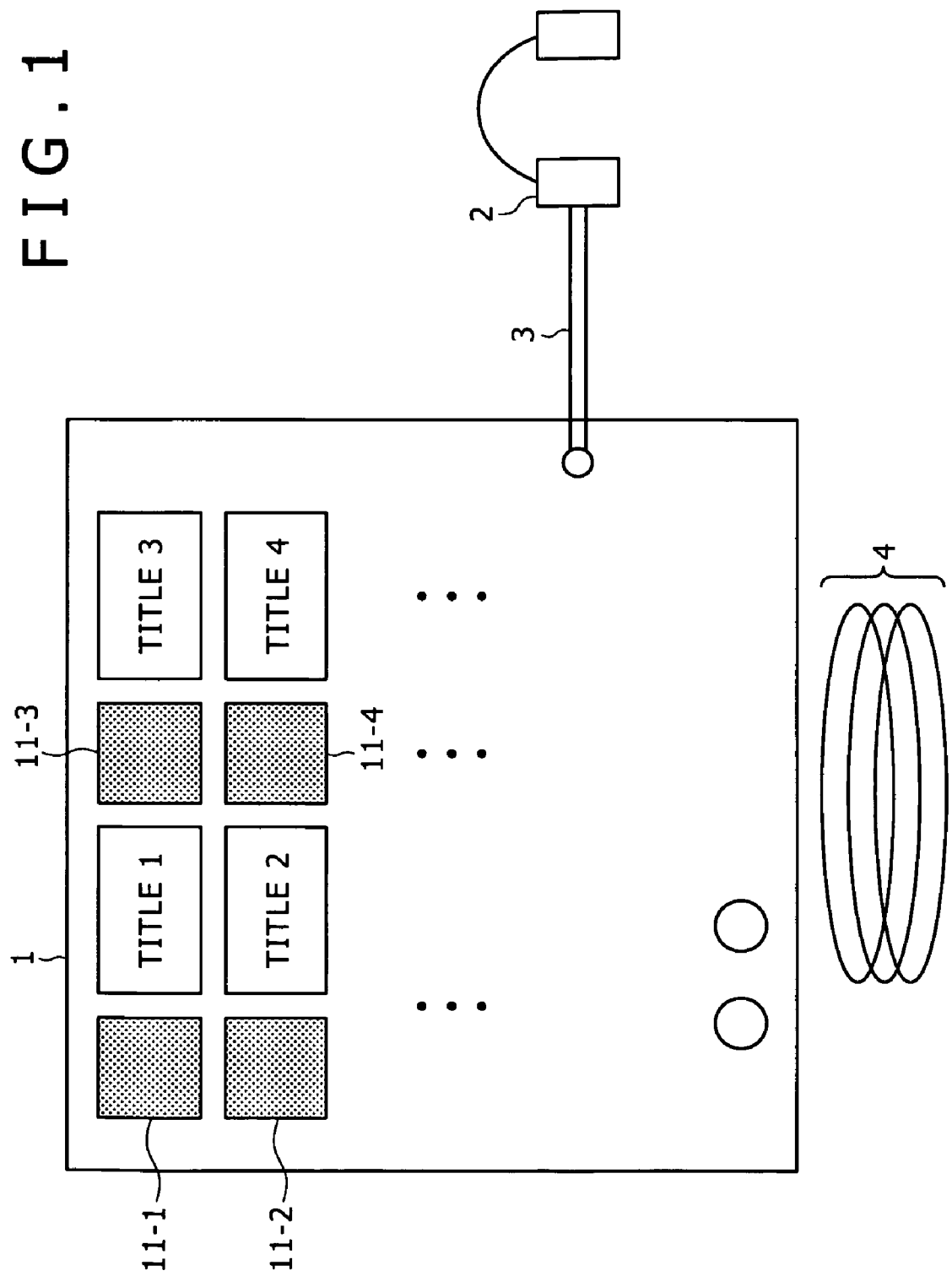
FIG. 1 is a block diagram of a conventional CD preview system.
Figure 2:
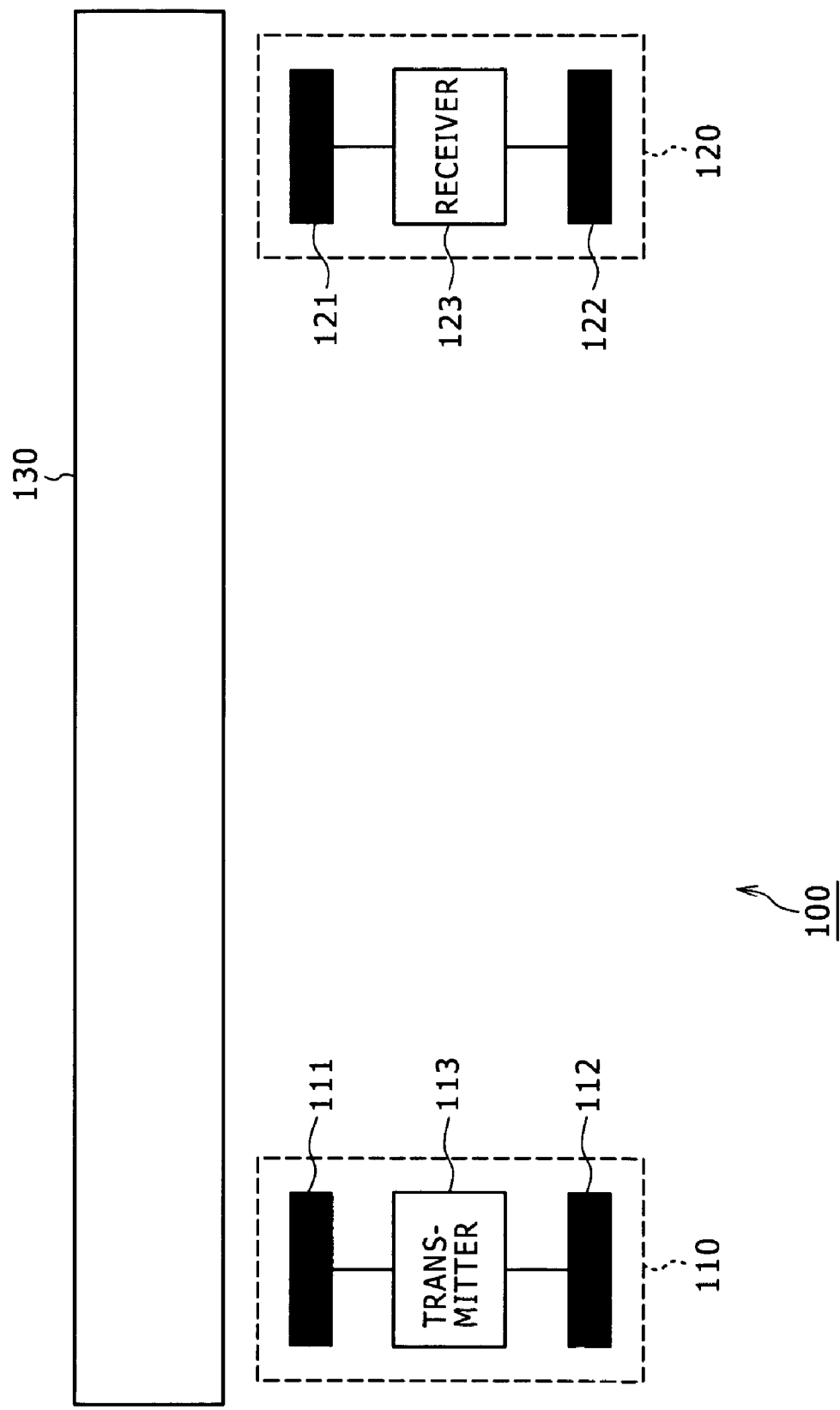
FIG. 2 is a block diagram of a communication system according to an embodiment of the present invention.

FIG. 2 shows in block form a communication system according to an embodiment of the present invention.

As shown in FIG. 2, the communication system, generally denoted by 100, includes a transmission device 110, a reception device 120, and a communication medium 130. In the communication system 100, the transmission device 110 and the reception device 120 send and receive signals through the communication medium 130. Specifically, a signal sent from the transmission device 110 is transmitted through the communication medium 130 and received by the reception device 120.

The transmission device 110 has a transmission signal electrode 111, a transmission reference electrode 112, and a transmitter 113. The transmission signal electrode 111 is an electrode for sending a signal to be transmitted through the communication medium 130. The transmission reference electrode 112 is an electrode for providing a reference point for determining a difference between high and low signal levels. The transmission signal electrode 111 is disposed so as to be electrostatically coupled to the communication medium 130 more intensively than the transmission reference electrode 112. The transmitter 113 is connected between the transmission signal electrode 111 and the transmission reference electrode 112, and gives an electric signal (potential difference) to be transmitted to the reception device 120 between the transmission signal electrode 111 and the transmission reference electrode 112.

The reception device 120 has a reception signal electrode 121, a reception reference electrode 122, and a receiver 123. The reception signal electrode 121 is an electrode for receiving a signal transmitted through the communication medium 130. The reception reference electrode 122 is an electrode for providing a reference point for determining a difference between high and low signal levels. The reception signal electrode 122 is disposed so as to be electrostatically coupled to the communication medium 130 more intensively than the reception reference electrode 122. The transmitter 123 is connected between the reception signal electrode 121 and the reception reference electrode 122, and converts an electric signal (potential difference) generated between the reception signal electrode 121 and the reception reference electrode 122 into a desired electric signal, thereby recovering the electric signal generated by the transmitter 113 of the transmission device 110.

The communication medium 130 is made of a material having physical properties capable of transmitting electric signals, e.g., a conductive material, a dielectric material, or the like. For example, the communication medium 130 is made a conductive material typified by metal, e.g., copper, iron, aluminum, or the like. Alternatively, the communication medium 130 is made pure water, rubber, glass, or an electrolytic solution such as brine or the like, or a dielectric material such as a biological material which is a composite of some of the above materials. The communication medium 130 may be of any shapes, e.g., a linear shape, a planar shape, a spherical shape, a prismatic shape, a cylindrical shape, or any of various other shapes.

First, the relationship between the electrodes, the communication medium, and the space around the transmission and reception devices will first be described below. It is assumed for the sake of convenience that the communication medium 130 is a perfect conductor. Space is present between the transmission signal electrode 111 and the communication medium 130 and also between the reception signal electrode 121 and the communication medium 130, i.e., no electric coupling is provided therebetween. Stated otherwise, electrostatic capacitances are present between the transmission signal electrode 111 and the communication medium 130 and between the transmission signal electrode 111 and the reception signal electrode 121.

The transmission reference electrode 112 is oriented toward the space around the transmission device 110, and the reception reference electrode 122 is oriented toward the space around the reception device 120. Generally, if a conductor is present in space, an electrostatic capacitance is formed in the space near the surface of the conductor. For example, if the conductor is in the form of a sphere having a radius "r" [m], then the electrostatic capacitance C is determined according to the following equation (1):

$$C = 4 \times \pi \times \in \times r \quad (1)$$

where $\pi$ represents the circle ratio and $\in$ the dielectric constant of the medium surrounding the conductor. The dielectric constant $\in$ is determined according to the following equation (2):

$$\in = \in_r \times \in_0 \quad (2)$$

where $\in_0$ represent the dielectric constant in vacuum and is expressed as $8.854 \times 10^{-12}$ [F/m], and $\in_r$ the specific inductive capacity which is indicative of the ratio with respect to the dielectric constant $\in_0$ in vacuum.

As indicated by the equation (1), the greater the radius r, the greater the electrostatic capacitance C. The magnitude of the electrostatic capacitance C of a conductor having a complex shape other than the sphere cannot simply be expressed according to the equation (1), but obviously changes depending on the surface area of the conductor.

As described above, the transmission reference electrode 112 provides an electrostatic capacitance with respect to the space around the transmission device 110, and the reception reference electrode 122 provides an electrostatic capacitance with respect to the space around the reception device 120. This means that as viewed from a hypothetical point at infinity outside of the transmission device 110 and the reception device 120, the potentials of the transmission reference electrode 112 and the reception reference electrode 122 are fixed and are not liable to vary.

The principles of a communication scheme in the communication system will be described below. For the sake of convenience or due to the context, a capacitor may simply be expressed as an electrostatic capacitance in the description that follows, as they have the same connotation.

The transmission device 110 and the reception device 120 are spaced from each other by a sufficient distance, so that their effect on each other is negligible. In the transmission device 110, the transmission signal electrode 111 is only electrostatically coupled to the communication medium 130, and the transmission reference electrode 112 is spaced a sufficient distance from the transmission signal electrode 111, with their effect on each other being negligible (they are not electrostatically coupled to each other). Similarly, in the reception device 120, the reception signal electrode 121 is only electrostatically coupled to the communication medium 130, and the reception reference electrode 122 is spaced a sufficient distance from the reception signal electrode 121, with their effect on each other being negligible (they are not electrostatically coupled to each other). In reality, since the transmission signal electrode 111, the reception signal electrode 121, and the communication medium 130 are placed in a space, they have respective electrostatic capacitances with respect to the space. For illustrative purposes, it is assumed that their electrostatic capacitances are negligible.

Figure 3:
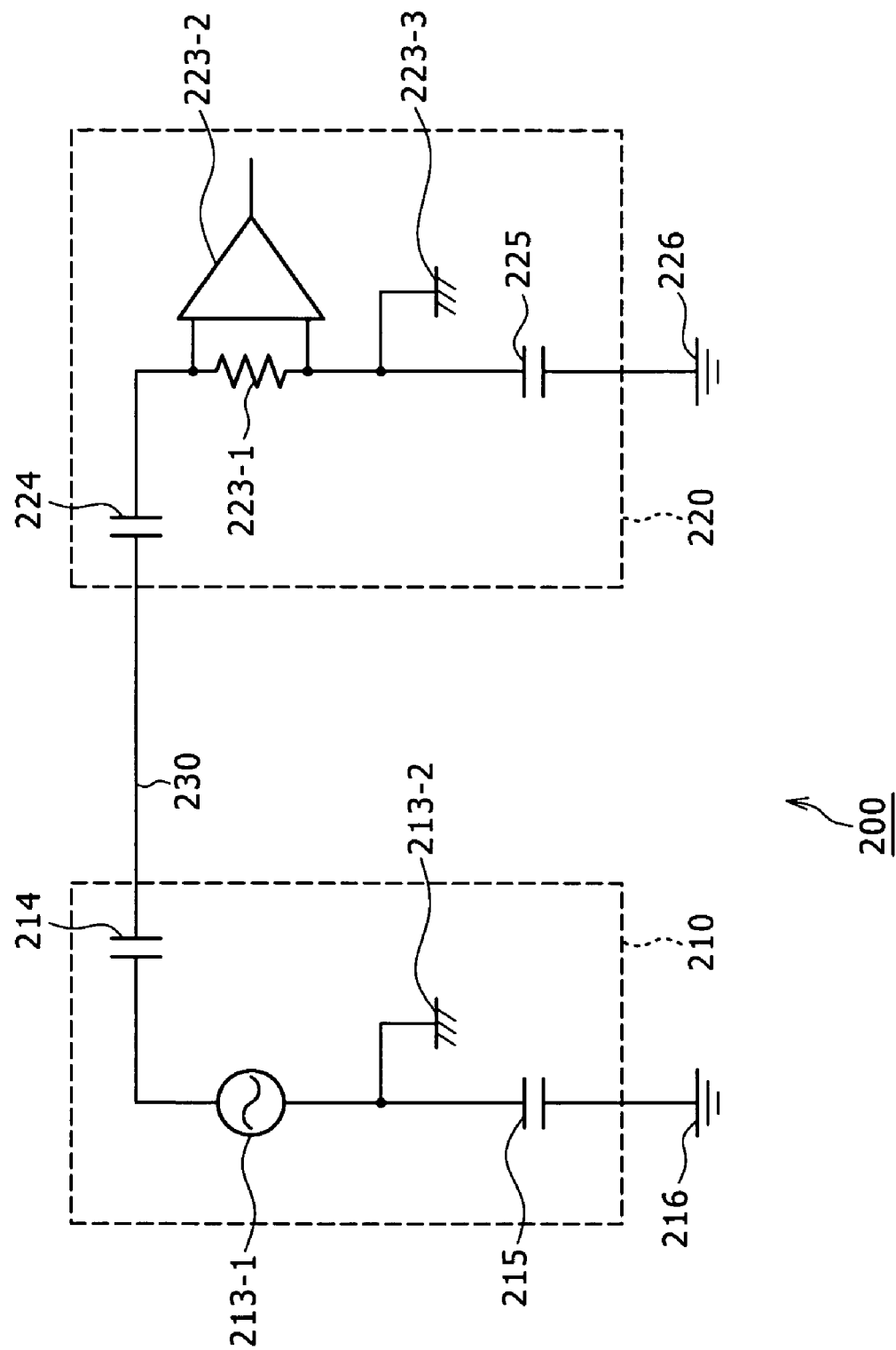
FIG. 3 is a circuit diagram showing an equivalent circuit of the communication system shown in FIG. 2 in an ideal state.

FIG. 3 is a circuit diagram showing an equivalent circuit of the communication system 100 shown in FIG. 2. A communication system 200 shown in FIG. 3 is an equivalent circuit representation of the communication system 100, and is essentially equivalent to the communication system 100.

The communication system 200 has a transmission device 210, a reception device 220, and a connecting line 230. The transmission device 210 corresponds to the transmission device 110 of the communication system 100 shown in FIG. 2, the reception device 220 to the reception device 120 of the communication system 100 shown in FIG. 2, and the connecting line 230 to the communication medium 130 of the communication system 100 shown in FIG. 2.

In the transmission device 210 shown in FIG. 3, a signal source 213-1 and a ground point 213-2 correspond to the transmitter 113 shown in FIG. 2. The signal source 213-1 generates a sine wave having a particular period $\omega \times t$ [rad] as a signal to be transmitted, where t [s] represents time and $\omega$ [rad/s] an angular frequency, which can be expressed according to the equation (3) below.

$$\omega = 2 \times \pi \times f \quad (3)$$

where $\pi$ represents the circle ratio and f [Hz] the frequency of the signal generated by the signal source 213-1. The ground point 213-2 is a point connected to the ground of the circuit in the transmission device 210. The signal source 213 has a terminal set to a given reference potential of the circuit in the transmission device 210.

A capacitor Cte 214 represents an electrostatic capacitance between the transmission signal electrode 111 and the communication medium 130 in FIG. 2. The capacitor Cte 214 is present between a terminal of the signal source 213-1 remote from the ground point 213-2 and the connecting line 230. A capacitor Ctg 215 represents an electrostatic capacitance of the transmission reference electrode 112 shown in FIG. 2 with respect to the space. The capacitor Ctg 215 is present between the terminal of the signal source 213-1 which is connected to the ground point 213-3 and a ground point 216 in the space which represents a hypothetical point at infinity with respect to the transmission device 110.

In the reception device 220 shown in FIG. 3, a resistor Rr 223-1, a detector 223-2, and a ground point 223-2 correspond to the receiver 123 shown in FIG. 2. The resistor Rr 223-1 is a load resistor (reception load) for picking up a received signal. The detector 223-2, which includes an amplifier, detects and amplifies a potential difference across the resistor 223-1. The ground point 223-3 is a point connected to the ground of the circuit in the reception device 220. The resistor Rr 223-1 has a terminal, i.e., a terminal of the detector 223-2, set to a given reference potential of the circuit in the reception device 220.

The detector 223-2 may have other functions, e.g., functions to demodulate a modulated signal that has been detected and to decode encoded information included in a signal that has been detected.

A capacitor Cre 224 represents an electrostatic capacitance between the reception signal electrode 121 and the communication medium 130 in FIG. 2. The capacitor Cre 224 is present between a terminal of the resistor Rr 223-1 remote from the ground point 223-3 and the connecting line 230. A capacitor Crg 225 represents an electrostatic capacitance of the reception reference electrode 122 shown in FIG. 2 with respect to the space. The capacitor Crg 225 is present between the terminal of the resistor Rr 223-1 which is connected to the ground point 223-2 and a ground point 226 in the space which represents a hypothetical point at infinity with respect to the reception device 120.

The connecting line 230 represents the communication medium 130 which includes a perfect conductor. In the communication system 200 shown in FIG. 3, the capacitor Ctg 215 and the capacitor Crg 225 are shown in the equivalent circuit as being electrically connected to each other through the ground point 216 and the ground point 226. Actually, however, the capacitor Ctg 215 and the capacitor Crg 225 do not need to be electrically connected to each other, but each may form an electrostatic capacitance with respect to the space around the transmission device 210 or the reception device 220. That is, the ground point 216 and the ground point 226 do not need to be electrically connected to each other, but may be independent of each other.

If there is a conductor, then it necessarily forms an electrostatic capacitance with respect to a space surrounding the conductor, the electrostatic capacitance being proportional to the surface area of the conductor. The transmission device 210 and the reception device 220 may be spaced from each other by any possible distance. For example, if the communication medium 130 shown in FIG. 2 is a perfect conductor, then since the conductivity of the connecting line 230 is regarded as being infinitely large, the length of the connecting line 230 does not affect communications therethrough. If the communication medium 130 is a conductor having a sufficient conductivity, then the distance between the transmission device 110 and the reception device 120 does not practically affect the stability of communications therebetween.

In the communication system 200, the signal source 213-1, the resistor Rr 223-1, the capacitor Cte 214, the capacitor Ctg 215, the capacitor Cre 224, and the capacitor Crg 225 jointly make up a circuit. The four capacitors, i.e., the capacitor Cte 214, the capacitor Ctg 215, the capacitor Cre 224, and the capacitor Crg 225, which are connected in series, have a combined capacitance Cx, which is expressed by the following equation (4):

$$C_x = \frac{1}{\frac{1}{Cte} + \frac{1}{Ctg} + \frac{1}{Cre} + \frac{1}{Crg}} \quad [F] \quad (4)$$

The sine wave Vt(t) generated by the signal source 213-1 is expressed by the following equation (5):

$$V_t(t) = V_m \times \sin(\omega t + \theta) [V] \quad (5)$$

where Vm [V] represents the maximum amplitude value of the signal source voltage, and θ [rad] the initial phase angle. An effective value of the voltage from the signal source 213-1 is determined by the following equation (6):

$$V_{trms} = \frac{V_n}{\sqrt{2}} \quad [V] \quad (6)$$

The combined impedance Z of the entire circuit is determined by the following equation (7):

$$Z = \sqrt{Rr^2 + \frac{1}{(\omega C_x)^2}} \quad (7)$$

$$= \sqrt{Rr^2 + \frac{1}{(2\pi f c_x)^2}} \quad [\Omega]$$

The effective value Vrrms of the voltage across the resistor Rr 223-1 is determined by the following equation (8):

$$V_{rms} = \frac{Rr}{Z} \times V_{trms} \quad (8)$$

$$= \frac{Rr}{\sqrt{Rr^2 + \frac{1}{(2\pi f C_x)^2}}} \times V_{trms} \quad [V]$$

As indicated by the equation (8), as the resistance value of the resistor Rr 223-1 is greater and as the electrostatic capacitance Cx is greater and the frequency f [Hz] of the signal source 213-1 is higher, the term $1/((2\times\pi\times f\times Cx)^2)$ is smaller, allowing a larger signal to be developed across the resistor Rr 223-1.

For example, if the effective value Vtrms of the voltage from the signal source 213-1 of the transmission device 210 is fixed to 2 [V], the frequency f of the signal generated by the signal source 213-1 is 1 [MHz], 10 [MHz], or 100 [MHz], the resistance value of the resistor Rr 223-1 is 10 K [Ω], 100 K [Ω], or 1 M [Ω], and the electrostatic capacitance Cx of the entire circuit is 0.1 [pF], 1 [pF], or 10 [pF], then the effective value Vrrms of the voltage developed across the resistor Rr 223-1 is calculated as indicated in a table 250 shown in FIG. 4.

As indicated by the table 250, the effective value Vrrms is greater when the frequency f is 10 [MHz] than when it is 1 [MHz] insofar as the other conditions remain the same, greater when the resistance value of the resistor Rr 223-1, serving as the reception load, is 1 M [Ω] than when it is 10 K [Ω], and greater when the electrostatic capacitance Cx is 10 [pF] than when it is 0.1 [pF]. Stated otherwise, the effective value Vrrms is greater as the frequency f is higher, the resistance value of the resistor Rr 223-1 is greater, and the electrostatic capacitance Cx is greater.

It can also be seen from the table 250 that an electric signal is generated across the resistor Rr 223-1 even if the electrostatic capacitance is of a value in picofarads or less. Therefore, if the level of a signal that is transmitted is small, then the signal detected by the detector 223-2 of the reception device 220 may be amplified to make communications possible between the transmission device 210 and the reception device 220.

It will be understood from the calculated results described above that according to basic principles, a signal can be transmitted from the transmission device to the reception device by utilizing the electrostatic capacitance that is formed with respect to the space around the transmission device and the reception device.

The electrostatic capacitance provided by the transmission reference electrode and the reception reference electrode with respect to the space can be formed if a space is present at the transmission reference electrode and the reception reference electrode. The transmission device and the reception device can communicate stably with each other independently of the distance therebetween if the transmission signal electrode and the reception signal electrode are coupled to each other by the communication medium.

Effects that the magnitude of the distance between the transmission device and the reception device has on communications will be described below. According to the principles of the present invention, as described above, if a sufficient electrostatic capacitance is formed by the transmission reference electrode and the reception reference electrode with respect to the space therearound, then communications between the transmission device and the reception device do not need a ground path near the transmission device and the reception device or other electric paths, and do not depend on the distance between the transmission signal electrode and the reception signal electrode. For example, in a communication system 700 shown in FIG. 5, a transmission device 710 and a reception device 720 are spaced a far distance from each other, and a transmission signal electrode 711 and a reception signal electrode 721 are electrostatically coupled to each other by a communication medium 730 that is sufficiently conductive or dielectric for making it possible to allow communications between transmission device 710 and the reception device 720. At this time, a transmission reference electrode 712 is electrostatically coupled to the space around the transmission device 710, and a reception reference electrode 722 is electrostatically coupled to the space around the reception device 720. Therefore, the transmission reference electrode 712 and the reception reference electrode 722 do not need to be electrostatically coupled to each other. However, as the communication medium 730 becomes longer and larger, the electrostatic capacitance formed by the communication medium 730 with respect to the space therearound increases. Such an increase in the electrostatic capacitance should be taken into account in determining parameters of the communication system 700.

Figure 5:
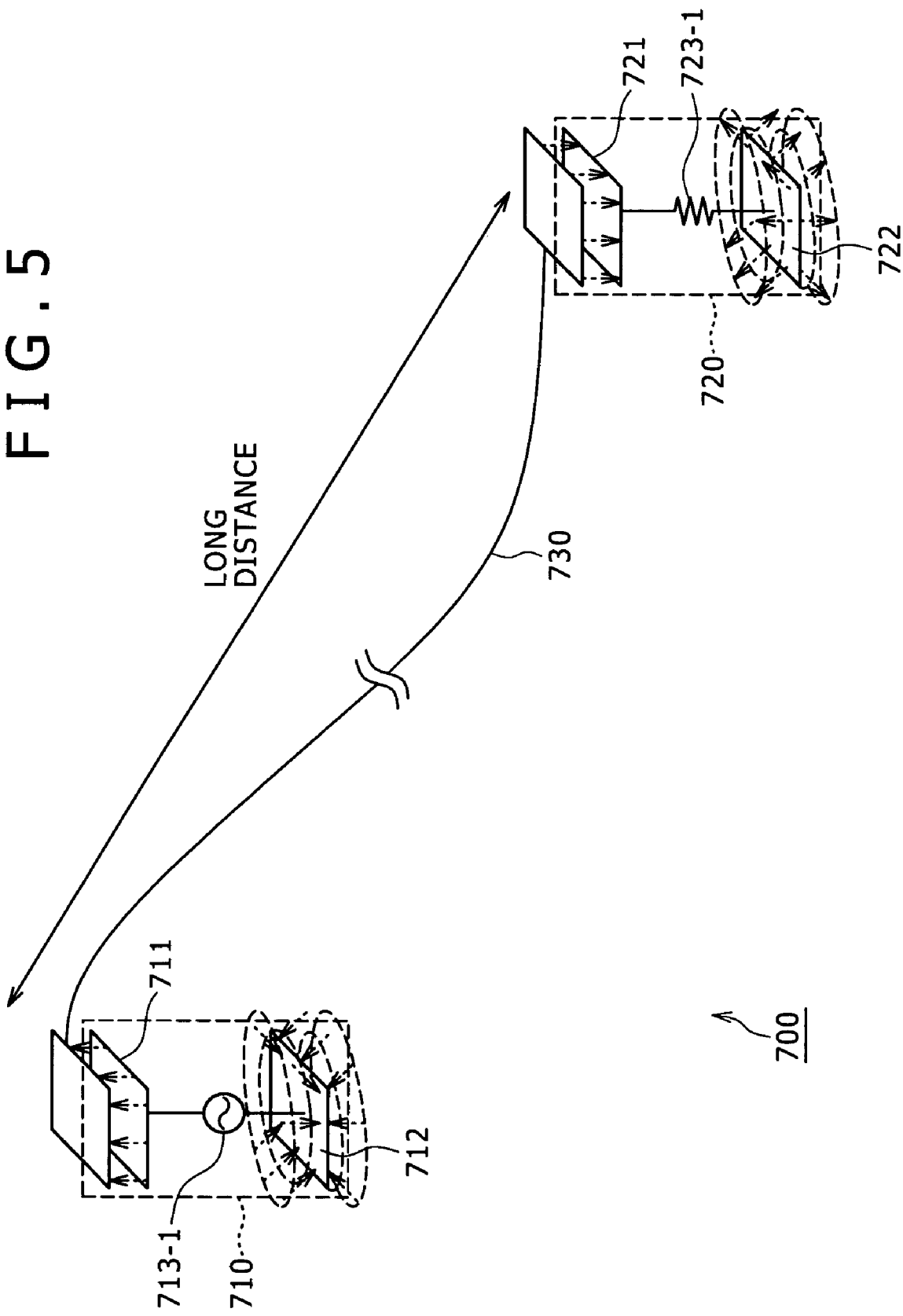
FIG. 5 is a schematic view showing an example in which the communication system shown in FIG. 2 is installed.

The communication system 700 shown in FIG. 5 corresponds to the communication system 100 shown in FIG. 2. Therefore, the transmission device 710 corresponds to the transmission device 110, the reception device 720 to the reception device 120, and the communication medium 730 to the communication medium 130.

The transmission signal electrode 711, the transmission reference electrode 712, and a signal source 713-1 of the transmission device 710 correspond respectively to the transmission signal electrode 111, the transmission reference electrode 112, and the transmitter 113 (or a portion thereof) of the transmission device 110. Similarly, the reception signal electrode 721, the reception reference electrode 722, and a signal source 723-1 of the reception device 720 correspond respectively to the reception signal electrode 121, the reception reference electrode 122, and the transmitter 123 (or a portion thereof) of the reception device 120.

Consequently, these components of the communication system 700 will not be described below.

As described above, the communication system 700 does not require a physical reference point path, but can achieve communications between the transmission device 710 and the reception device 720 through a communication signal transmission path.

In the foregoing description, the transmission signal electrode and the reception signal electrode are held out of contact with the communication medium. However, the transmission signal electrode and the reception signal electrode may be connected to each other by a conductive communication medium insofar as the transmission reference electrode and the reception reference electrode provide a sufficient electrostatic capacitance with respect to the space around the transmission device and the reception device.

Figure 6:
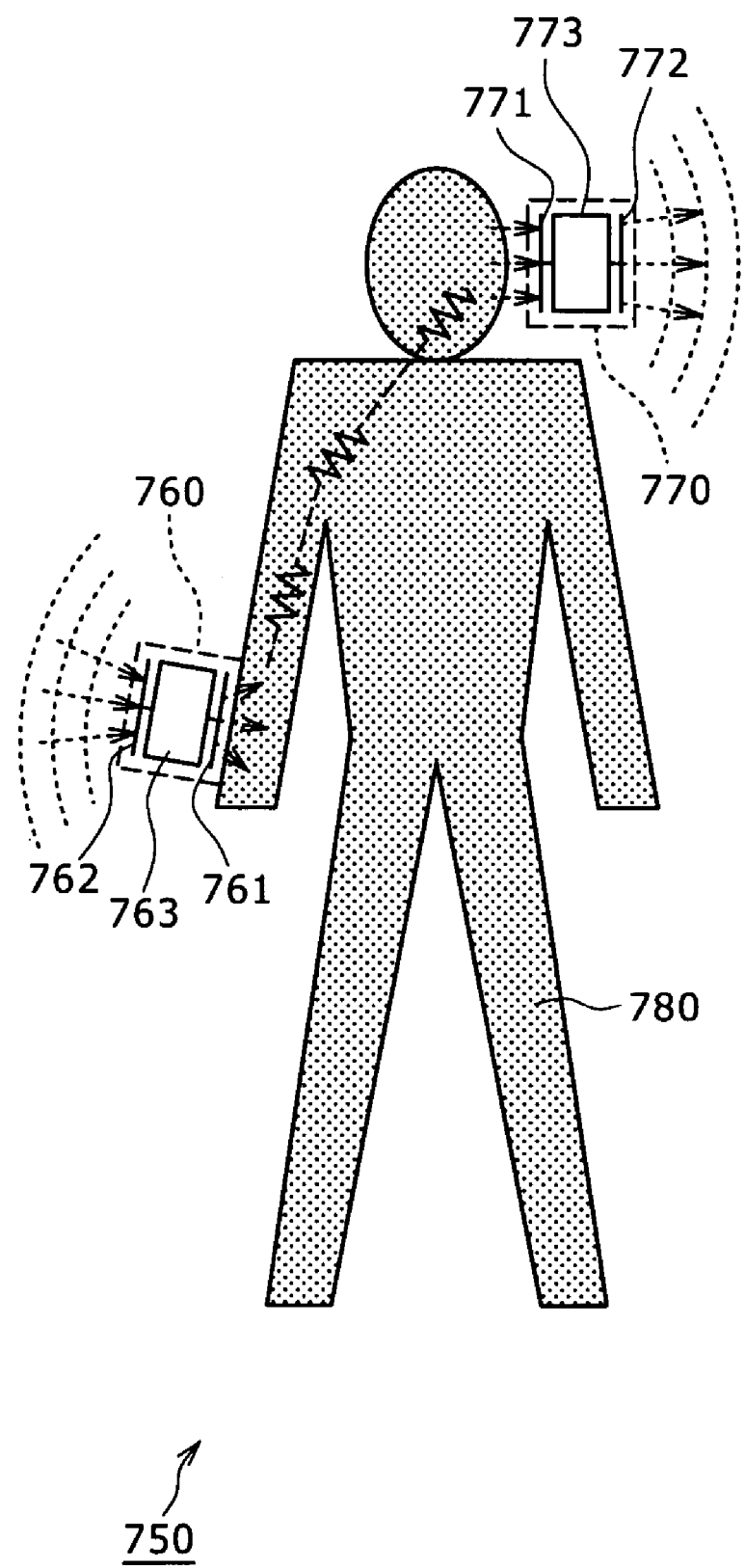
FIG. 6 is a schematic view showing an actual application of the communication system shown in FIG. 2.

Specific applications of the above communication system will be described below. The communication system may employ a biological body as a communication medium. FIG. 6 schematically shows a communication system for performing communications through a human body used as a communication medium. As shown in FIG. 6, a communication system 750 has a transmission device 760 mounted on an arm of a human body 780 for transmitting music data and a reception device 770 mounted on the head of the human body 780 for receiving the music data, converting the received music data into an audio signal, and outputting the audio signal for the user to hear. The communication system 750 corresponds to the above communication system, e.g., the communication system 100, with the transmission device 760 and the reception device 770 corresponding respectively to the transmission device 110 and the reception device 120 shown in FIG. 2. The human body 780 serves as a communication medium which corresponds to the communication medium 130 shown in FIG. 2.

The transmission device 760 has a transmission signal electrode 761, a transmission reference electrode 762, and a transmitter 763, which correspond respectively to the transmission signal electrode 111, the transmission reference electrode 112, and the transmitter 113 shown in FIG. 2. The reception device 770 has a reception signal electrode 771, a reception reference electrode 772, and a transmitter 773, which correspond respectively to the reception signal electrode 121, the reception reference electrode 122, and the transmitter 123 shown in FIG. 2.

The transmission device 760 and the reception device 770 are installed such that the transmission signal electrode 761 and the reception signal electrode 771 are disposed in contact with or closely to the human body 780 as a communication medium. Since the transmission reference electrode 762 and the reception reference electrode 772 may have an electrostatic capacitance with respect to the space, they do not need to be connected to ground, and the transmission and reception devices (or the electrodes thereof) do not need to be connected to each other.

Figure 7:
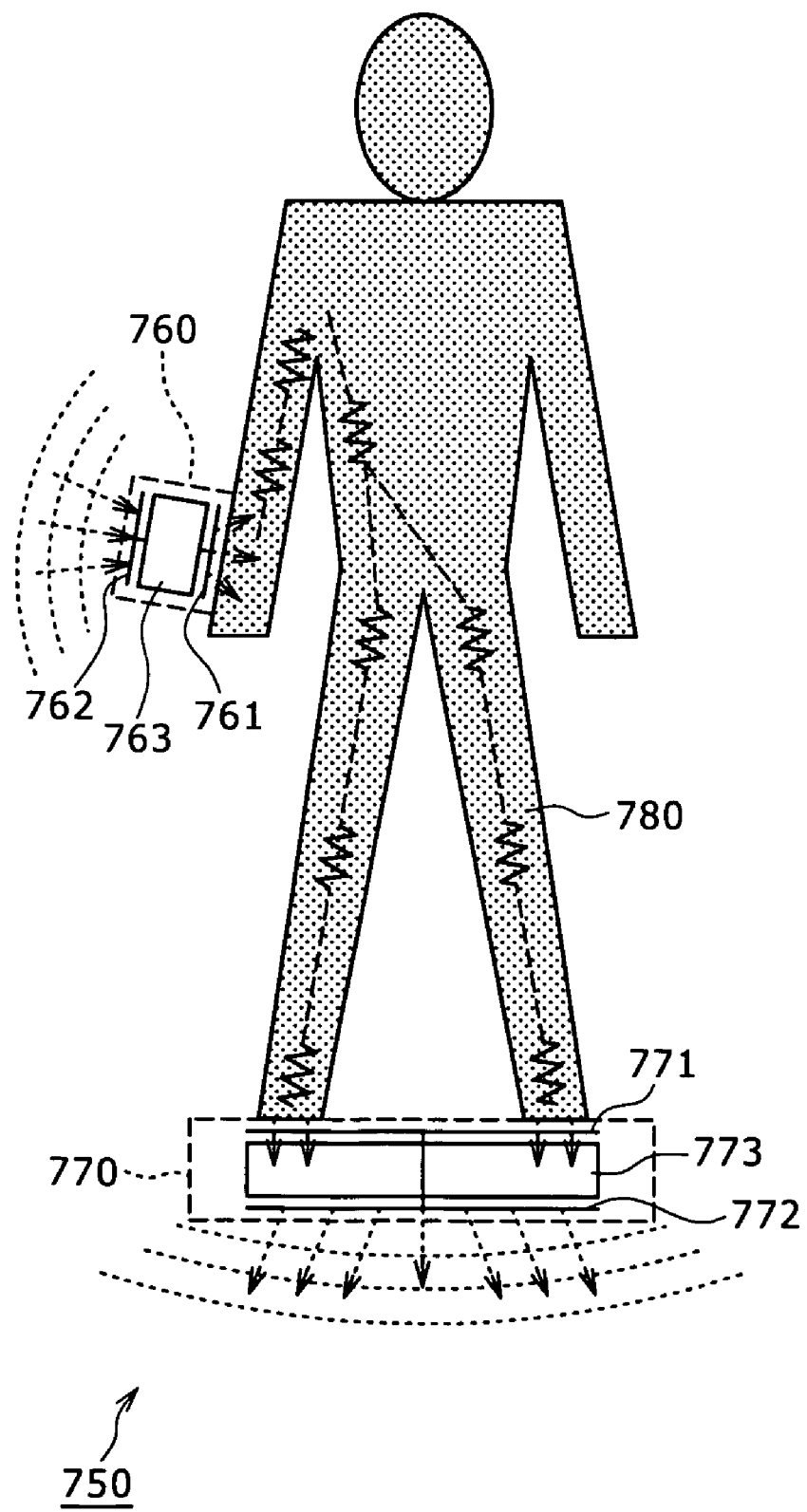
FIG. 7 is a schematic view showing another actual application of the communication system shown in FIG. 2.

FIG. 7 schematically shows another application of the communication system 750. Those parts shown in FIG. 7 which are identical to those shown in FIG. 6 are denoted by identical reference characters. As shown in FIG. 7, the reception device 770 is held in contact with or closely to the human body 780 through foot soles, and communicates with the transmission device 760 that is mounted on an arm of the human body 780. The transmission device 760 and the reception device 770 are installed such that the transmission signal electrode 761 and the reception signal electrode 771 are disposed in contact with or closely to the human body 780 as a communication medium, with the transmission reference electrode 762 and the reception reference electrode 772 being oriented to the space. The application shown in FIG. 7 could not be realized by the conventional systems which employ ground as a communication path.

According to the present invention, as described above, it is possible to perform radio communications through a human body as a communication medium without the need for a wiring facility such as a cable or the like.

The modulation process for modulating a signal to be transmitted through the transmission medium of the above transmission system is not limited to any particular type insofar as it is compatible with both the transmission device and the reception device. Any of various modulation processes may be selected based on the overall characteristics of the communication system. A specific modulation process which can be chosen may be a process for producing one or a mixture of a modulated baseband analog signal, an amplitude-modulated analog signal, a frequency-modulated analog signal, a modulated baseband digital signal, an amplitude-modulated digital signal, a frequency-modulated digital signal, and a phase-modulated digital signal.

The above communication system may be arranged to carry out a plurality of communication events through a single communication medium for fully duplex communications or communications between a plurality of devices through a single communication medium.

Examples of processes for realizing such multiplex communications will be described below. The first example is concerned with a process based on a spectrum spread system. According to this process, a frequency bandwidth and a certain time-series code are arranged between a transmission device and a reception device. The transmission device changes the frequency of an original signal in the frequency bandwidth according to the time-series code to spread the signal over the entire frequency band, and transmits the spread signal. The reception device receives the spread signal and integrates the received signal to decode the received signal.

Advantages offered by the frequency spreading will be described below. According to the Shannon-Hartley theorem about the channel capacity, the following equation is satisfied:

$$C = B \times \log_2\left(1 + \frac{S}{N}\right) \ [bps] \tag{23}$$

where C [bps] represents the channel capacity which indicates a theoretical maximum data rate at which data can be transmitted through a communication path, B [Hz] the channel bandwidth, and S/N the signal vs. noise power ratio (SN ratio). If the above equation is Maclaurin-expanded and it is assumed that the S/N ratio is low, then the above equation (23) can be approximated by the following equation (24):

$$C \approx \frac{S}{N} \times B \ [bps] \tag{24}$$

If the S/N ratio is of a level equal to or lower than floor noise, for example, then S/N<<1. By widening the channel bandwidth B, the channel capacity C can be increased to a desired level.

If a different time-series code is used for each communication path and a different frequency spreading process is employed, then frequencies are spread without mutual interference and no signal crosstalk occurs, thereby making it possible to perform a plurality of communication events at the same time.

The second example represents a process for employing a frequency division system for determining a frequency bandwidth between a transmission device and a reception device and dividing the frequency bandwidth into a plurality of regions. The transmission device (or the reception device) operates in accordance with a certain frequency band assigning rule or detects an idle frequency band at the time of starting communications and assigns a frequency band based on the detected idle frequency band.

Specifically, communication events take place in different frequency bands over respective communication paths to suppress mutual signal crosstalk for making it possible to perform a plurality of communication events at the same time over a single communication medium. The frequency division system that is employed allows many-to-single communications or many-to-many communications to be performed.

The third example is a process for employing a time division system for dividing a communication time into a plurality of time slots between a transmission device and a reception device. The transmission device (or the reception device) operates in accordance with a certain time dividing rule or detects an idle time region at the time of starting communications and divides the communication time based on the detected idle time region.

Specifically, communication events take place in different time bands over respective communication paths to suppress mutual signal crosstalk for making it possible to perform a plurality of communication events at the same time over a single communication medium. The time division system that is employed allows many-to-single communications or many-to-many communications to be performed.

According to another process, two or more of the first through third communication processes referred to above may be combined with each other.

An ability for a transmission device and a reception device to simultaneously communicate with a plurality of other devices is particularly important in certain applications. For example, in an application to the purchase of tickets for transport facilities, when a user owning a device A having the information of a commuter pass and a device B having an electronic money function walks through an automatic ticket gate, the automatic ticket gate simultaneously communicates with the device A and the device B according to the above process. If a zone that the user has traveled includes a zone not covered by the commuter ticket of the device A, then the fare shortage is automatically subtracted from the electronic money of the device B.

Figure 8:
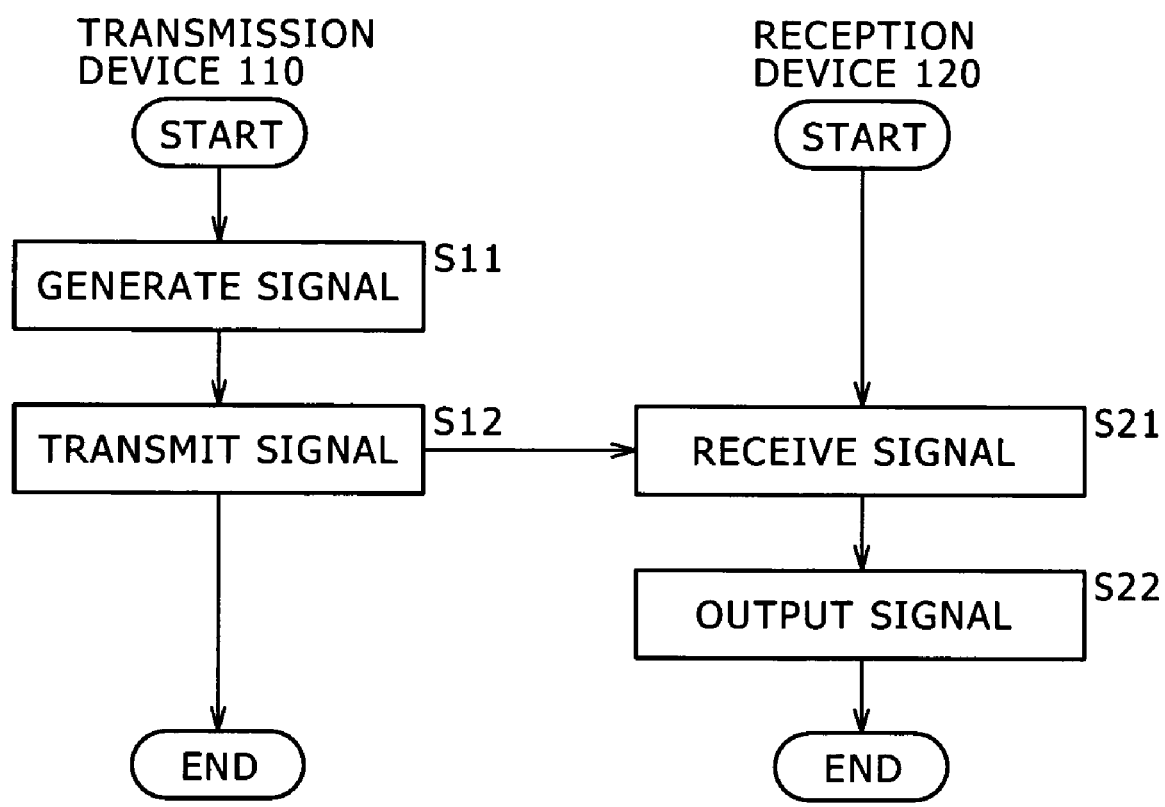
FIG. 8 is a flowchart of a communication sequence of the communication system shown in FIG. 2.

A communication sequence that is carried out for communications between a transmission device and a reception device will be described with reference to FIG. 8. It is assumed that the communication sequence takes place between the transmission device 110 and the reception device 120 of the communication system 100 shown FIG. 2.

The transmitter 113 of the transmission device 110 generates a signal to be transmitted in step S11, and transmits the generated signal through the transmission signal electrode 111 to the communication medium 130 in step S12. When the transmitter 113 has sent the signal, the transmitter 113 finishes its communication process. The signal transmitted from the transmitter 113 is supplied through the communication medium 130 to the reception device 120. The receiver 123 of the reception device 120 receives the signal through the reception signal electrode 121 in step S21, and outputs the receives signal in step S22. When the receiver 123 has output the received signal, the receiver 123 finishes its communication process.

As described above, the transmission device 110 and the reception device 120 can perform basic communications over the communication medium 130 through the simple process without the need for any complex processes. Specifically, the transmission device 110 and the reception device 120 do not need to construct a closed circuit using the reference electrodes, but simply transmit and receive the signal through the signal electrodes for easily performing a stable communication process without being affected by the environment. The transmission device 110 and the reception device 120 (the communication system 100) can reduce a communication process load for performing a stable communication process without being affected by the environment, and can be constructed at a reduced cost. Since the communication process is simplified in scheme, the communication system 100 can easily be combined with various many communication systems including modulating, encoding, encrypting, and multiplexing systems.

In the above communication system, the transmission device and the reception device are constructed separately from each other. However, a communication system may be constructed using a transceiver device which have the functions of both the transmission device and the reception device described above.

Figure 9:
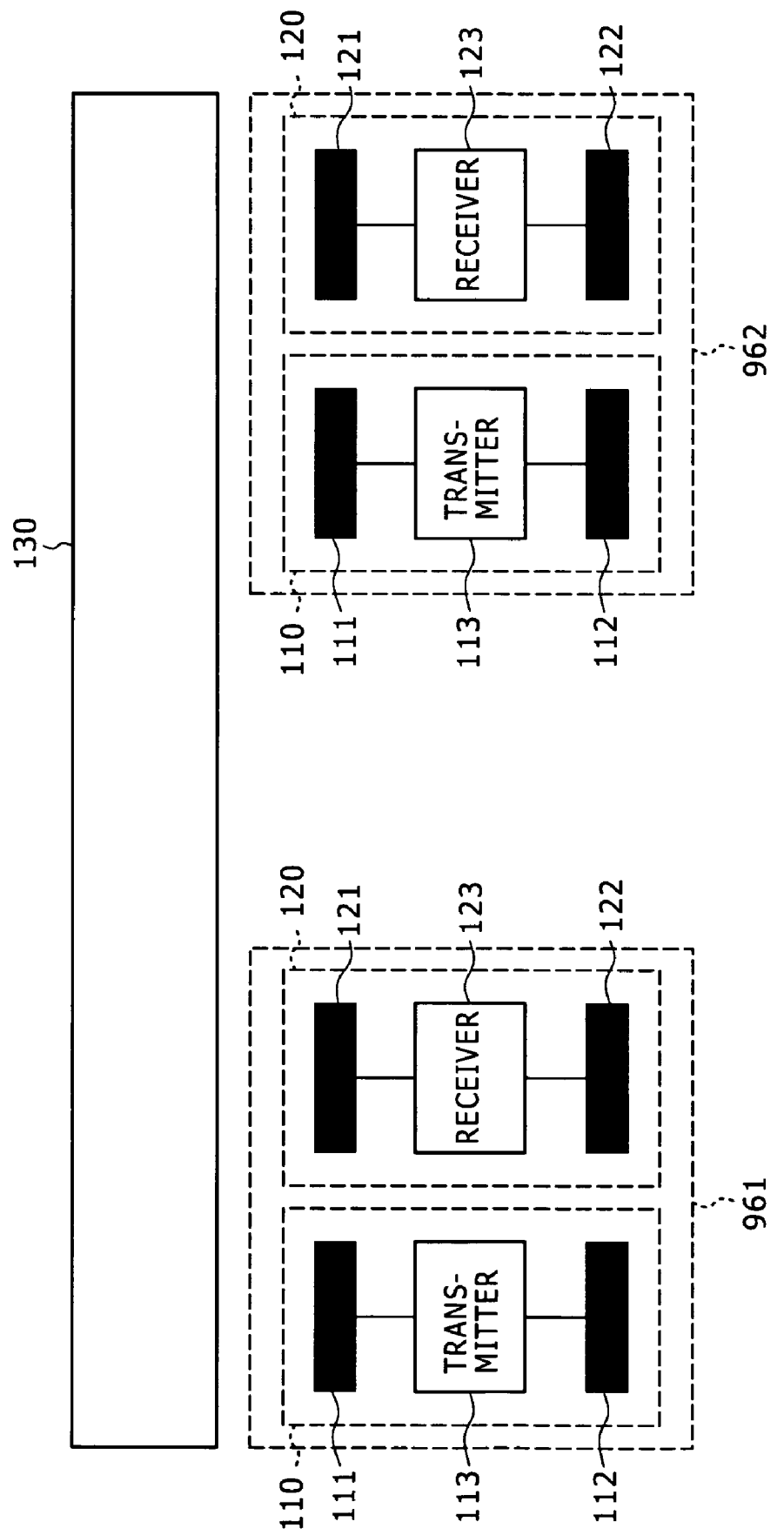
FIG. 9 is a block diagram of a communication system according to another embodiment of the present invention.

FIG. 9 shows in block form a communication system according to another embodiment of the present invention.

As shown in FIG. 9, a communication system 950 includes a transceiver device 961, a transceiver device 962, and a communication medium 130. In the communication system 950, the transceiver device 961 and the transceiver device 962 transmit and receive signals bidirectionally through the communication medium 130.

The transceiver device 961 has a transmission device 110 which is identical to the transmission device 110 shown in FIG. 2 and a reception device 120 which is identical to the reception device 120 shown in FIG. 2. Therefore, the transceiver device 961 has a transmission signal electrode 111, a transmission reference electrode 112, a transmitter 113, a reception signal electrode 121, a reception reference electrode 122, and a receiver 123.

In the transceiver device 961, the transmitter 110 sends a signal through the communication medium 130, and the receiver 120 receives a signal supplied through the communication medium 130. The transceiver device 961 is arranged such that communications via the transmitter 110 and communications via the receiver 120 do not interfere with other.

The transceiver device 962 is identical in structure and operation to the transceiver device 961, and will not be described below. The transceiver device 961 and the transceiver device 962 communicate bidirectionally with each other through the communication medium 130 in the same fashion as each other.

With the above arrangement, it is possible for the communication system 950 (the transceiver device 961 and the transceiver device 962) to easily perform bidirectional radio communications without the need for a wiring facility such as a cable or the like.

In the embodiment shown in FIG. 9, different electrodes are employed for transmitting and receiving signals. However, only one set of a signal electrode and a reference electrode may be employed for selectively transmitting and receiving signals.

Figure 10:
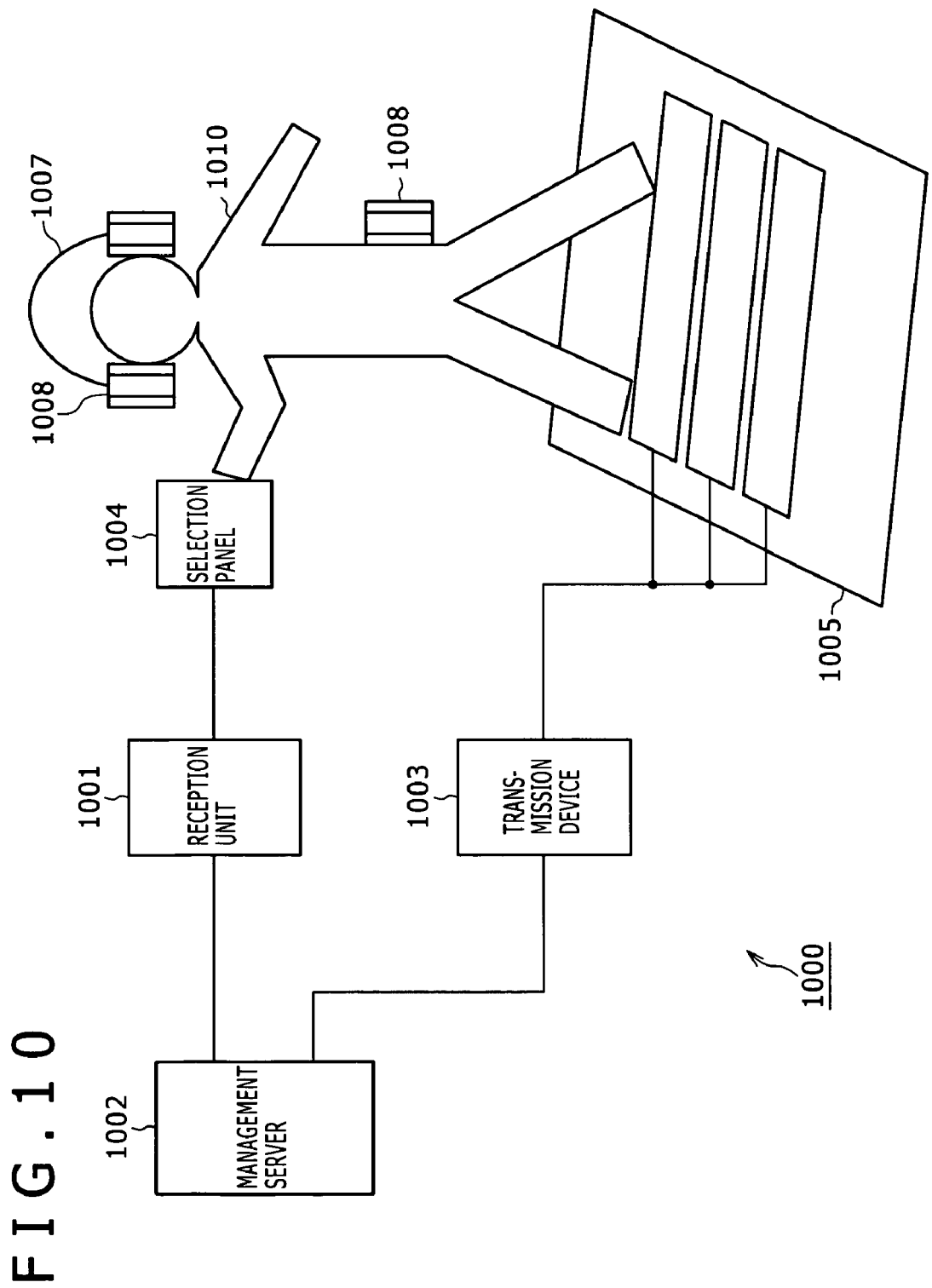
FIG. 10 is a block diagram of a contents preview system according to an embodiment of the present invention.

A traffic information system based on the radio communications described above with reference to FIGS. 2 through 9 will be described below. FIG. 10 shows in block form a contents preview system 1000 according to an embodiment of the present invention.

The contents preview system 1000 is installed in a shop such as a record shop or the like for a user 1010 to review desired contents. In FIG. 10, a reception unit 1001 specifies contents (e.g., a CD (Compact Disc) selected by the user 1010 who operates a selection panel 1004, and sends information required to reproduce the identified contents to a management server 1002 that is connected through a network or the like.

The management server 1002 is a server for storing data of contents. The management server 1002 transmits data of the contents identified by the reception unit 1001 to a transmission device 1003.

The transmission device 1003 receives the data of the contents sent from the management server 1002, generates a signal corresponding to the data, and outputs the signal from signal electrodes embedded in a shop floor 1005.

The reception unit 1001 and the transmission device 1003 may be combined into a single information processing device. Alternatively, the reception unit 1001, the transmission device 1003, and the management server 1002 may be combined into a single information processing device.

The user 1010 wears headphones 1007 for reviewing contents. A portable device 1008 for performing radio communications described above is mounted in a portion (a left speaker) of the headphones 1007. The portable device 1008 may not be mounted in the headphones 1007, but may be mounted on a belt worn by the user 1010. The portable device 1008 sends data of contents received thereby to the headphones 1007 through a wired or wireless link, and the headphones 1007 demodulates the data of the contents into an audio signal.

When the user 1010 is to select contents, the reception unit 1001 and the portable device 1008 perform radio communications described above with reference to FIGS. 2 through 9, through a signal electrode disposed in the selection panel 1004, and the reception unit 1001 receives information about the user 1010 and information for identifying the selected contents. When the user 1010 is to review contents with the headphones 1007, the portable device 1008 performs radio communications described above with reference to FIGS. 2 through 9 with the transmission device 1003 through the signal electrodes embedded in the shop floor 1005, receives a contents signal sent from the transmission device 1003, and outputs a signal corresponding to the received contents signal from the speakers of the headphones 1007.

For the reception unit 1001 and the portable device 1008 to communicate with each other, the reception unit 1001 and the portable device 1008 make up a communication system similar to the communication system 950 shown in FIG. 9. The reception unit 1001 corresponds to the transceiver device 961 shown in FIG. 9, and the portable device 1008 to the transceiver device 962 shown in FIG. 9. For the transmission device 1003 and the portable device 1008 to communicate with each other, the transmission device 1003 and the portable device 1008 make up a communication system similar to the communication system 950 shown in FIG. 9. The transmission device 1003 corresponds to the transceiver device 961 shown in FIG. 9, and the portable device 1008 to the transceiver device 962 shown in FIG. 9.

Figure 11:
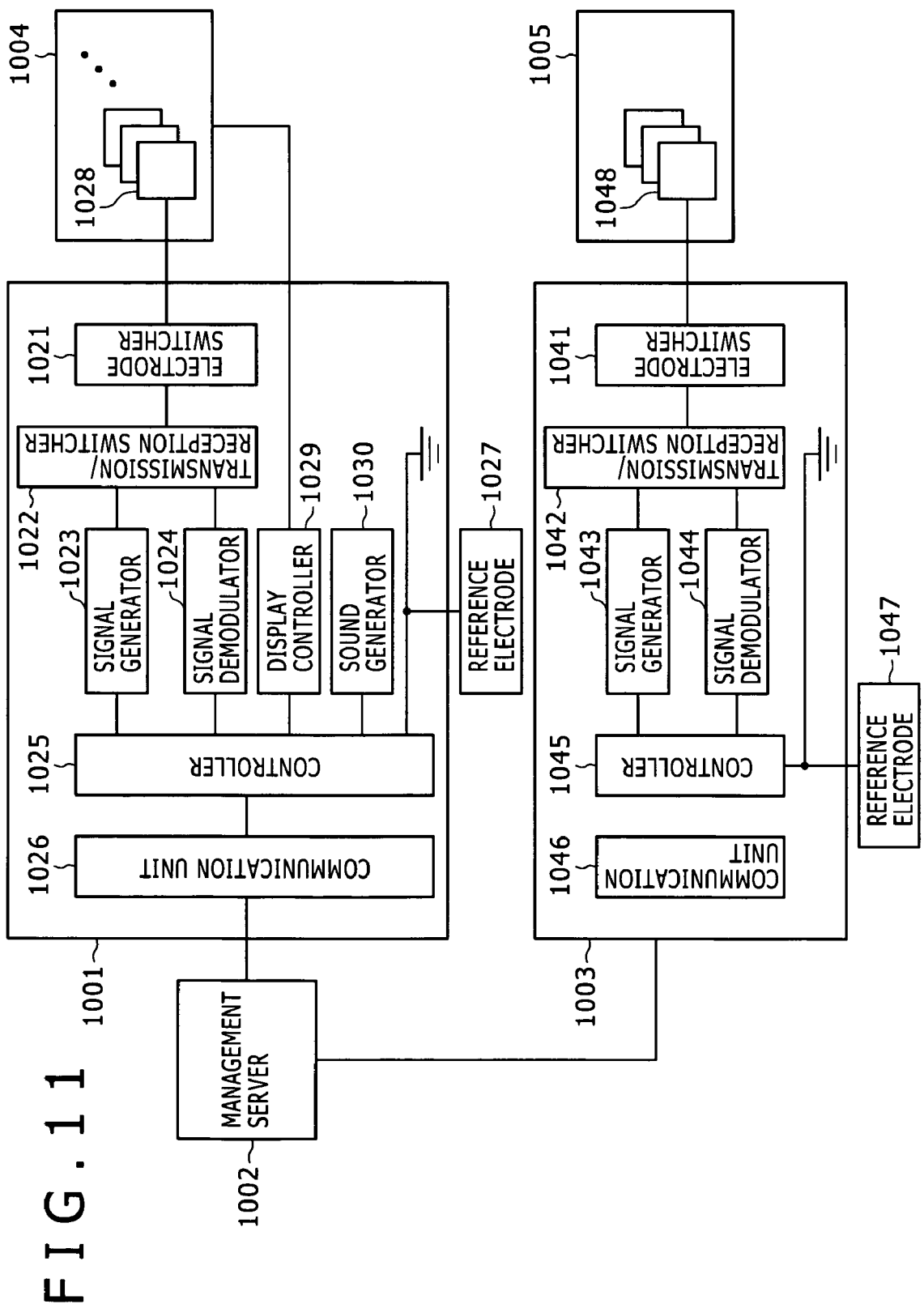
FIG. 11 is a block diagram of a reception device and a transmission device of the contents preview system shown in FIG. 10.

Internal structural details of the reception unit 1001 and the transmission device 1003 will be described below with reference to FIG. 11. An electrode switcher 1021 switches conduction states of a plurality of signal electrodes 1028 on the selection panel 1004, e.g., successively turns on and off the signal electrodes 1028. The signal electrodes are collectively denoted by 1028. If the signal electrodes need to be individually distinguished, then they are denoted by 1028-1, 1028-2, . . . .

A transmission/reception switcher 1022 connects the electrode switcher 1021 selectively to a signal generator 1023 and a signal demodulator 1024 under the control of a controller 1025.

When the reception device 1001 is to send information to the portable device 1008, the signal generator 1023 generates a signal representing the information under the control of the controller 1025. When the reception device 1001 receives information, i.e., a signal representing the information, from the portable device 1008, the signal demodulator 1024 demodulates the signal and supplies the demodulated signal to the controller 1025.

The controller 1025 controls operation of the signal generator 1023 and the signal demodulator 1024, generates a signal representing data received from the management server 1002 that is connected through a communication unit 1026, and transmits data represented by a signal supplied from the signal demodulator 1024 through the communication unit 1026 to the management server 1002. The controller 1025 has a storage unit such as a memory and an HDD (Hard Disk Drive) for storing information.

The communication unit 1026 controls the transmission of data to and the reception of data from the management server 1002 through a wired or wireless network.

A display controller 1029 controls the display on the selection panel 1004 based on a command from the controller 1025. Specifically, the display controller 1029 switches between displayed data such as CD titles displayed on the selection panel 1004. Structural details of the selection panel 1004 will be described later.

A sound generator 1030 generates a predetermined operating sound and a message based on an operating action which is made on the selection panel 1004 by the user, and outputs the operating sound and the message through a speaker, not shown, disposed near the selection panel 1004.

The reception unit 1001 performs radio communications according to the present invention with the portable device 1008 as described above. The signal electrodes 1028 are disposed closely to the communication medium such as a human body, i.e., are mounted on buttons on the selection panel 1004 that are touched by a hand of the user. A reference electrode 1027 is disposed so as to face the space. The reference electrode 1027 corresponds to the transmission reference electrode 112 or the reception reference electrode 122 shown in FIG. 9, and the signal electrodes 1028 correspond to the transmission signal electrode 111 or the reception signal electrode 121 shown in FIG. 9.

The transmission device 1003 has an electrode switcher 1041, a transmission/reception switcher 1042, a signal generator 1043, a signal demodulator 1044, a controller 1045, a communication unit 1046, a reference electrode 1047, and signal electrodes 1048, which are identical to the corresponding ones of the reception unit 1001 and will not be described in detail below.

Figure 12:
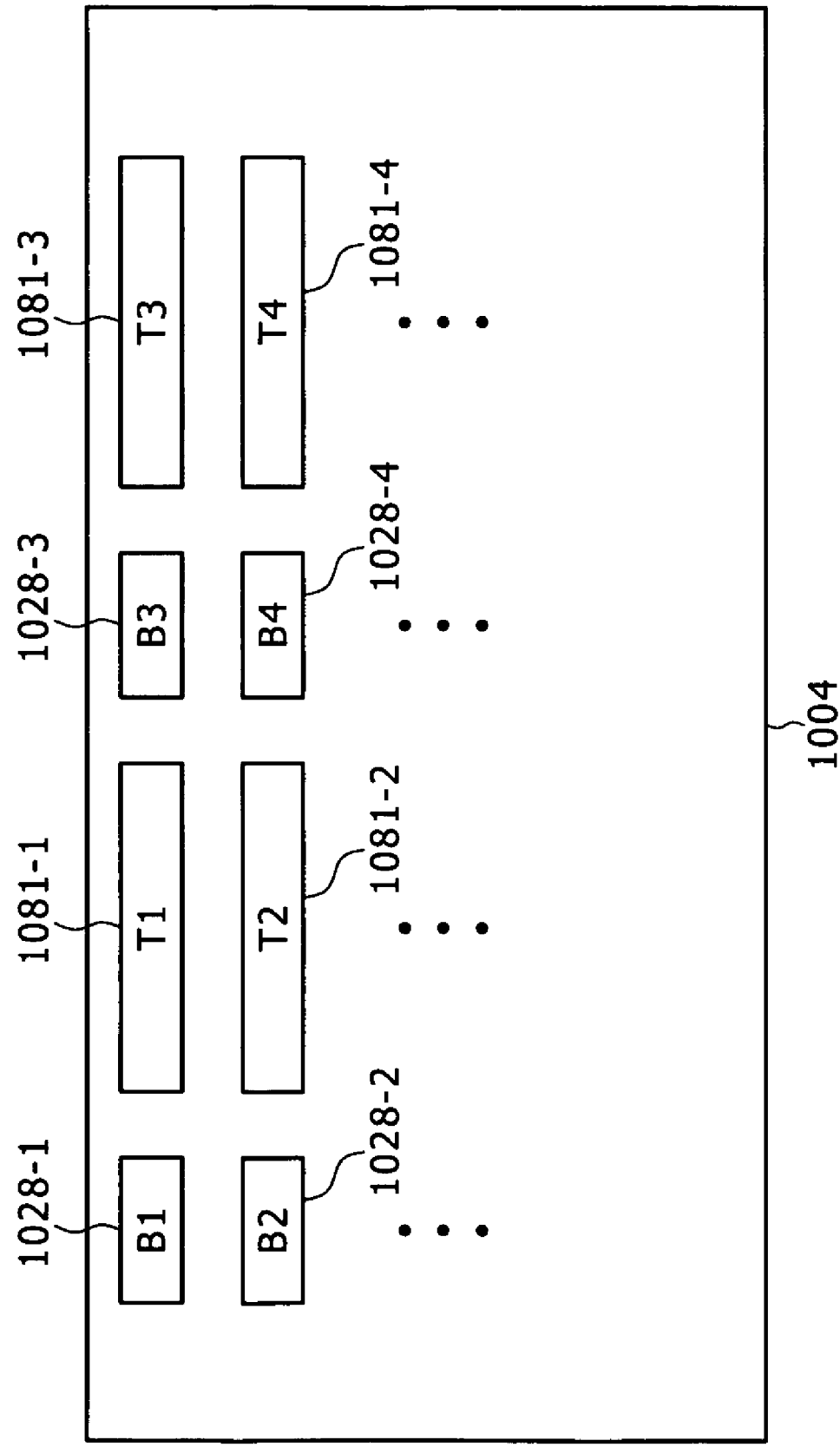
FIG. 12 is a block diagram showing a selection panel in detail.

FIG. 12 shows in block form structural details of the selection panel 1004. As shown in FIG. 12, the selection panel 1004 has a plurality of buttons B1, B2, B3, B4, . . . and a plurality of titles T1, T2, T3, T4, . . . associated respectively therewith. The signal electrodes 1028-1, 1028-2, 1028-3, 1028-4, . . . are connected (bonded) to the buttons B1, B2, B3, B4, . . . , respectively. When the user touches one of the buttons, the signal electrode of the portable device 1008 and the corresponding signal electrode 1028 of the reception unit perform radio communications with each other through the finger of the user. The titles are displayed in respective spaces 1081-1, 1081-2, 1081-3, 1081-4, . . . , which include liquid crystal display units, for example, for displaying the information of the titles T1, T2, T3, T4, . . . under the control of the display controller 1029.

For example, when the user 1010 touches the button B1 on the selection panel 1004, the signal electrode 1028-1 performs radio communications with the portable device 1008, and the contents of the title T1 corresponding to the signal electrode 1028-1 (the button B1) and the portable device 1008 worn by the user 1010 are specified.

Figure 13:
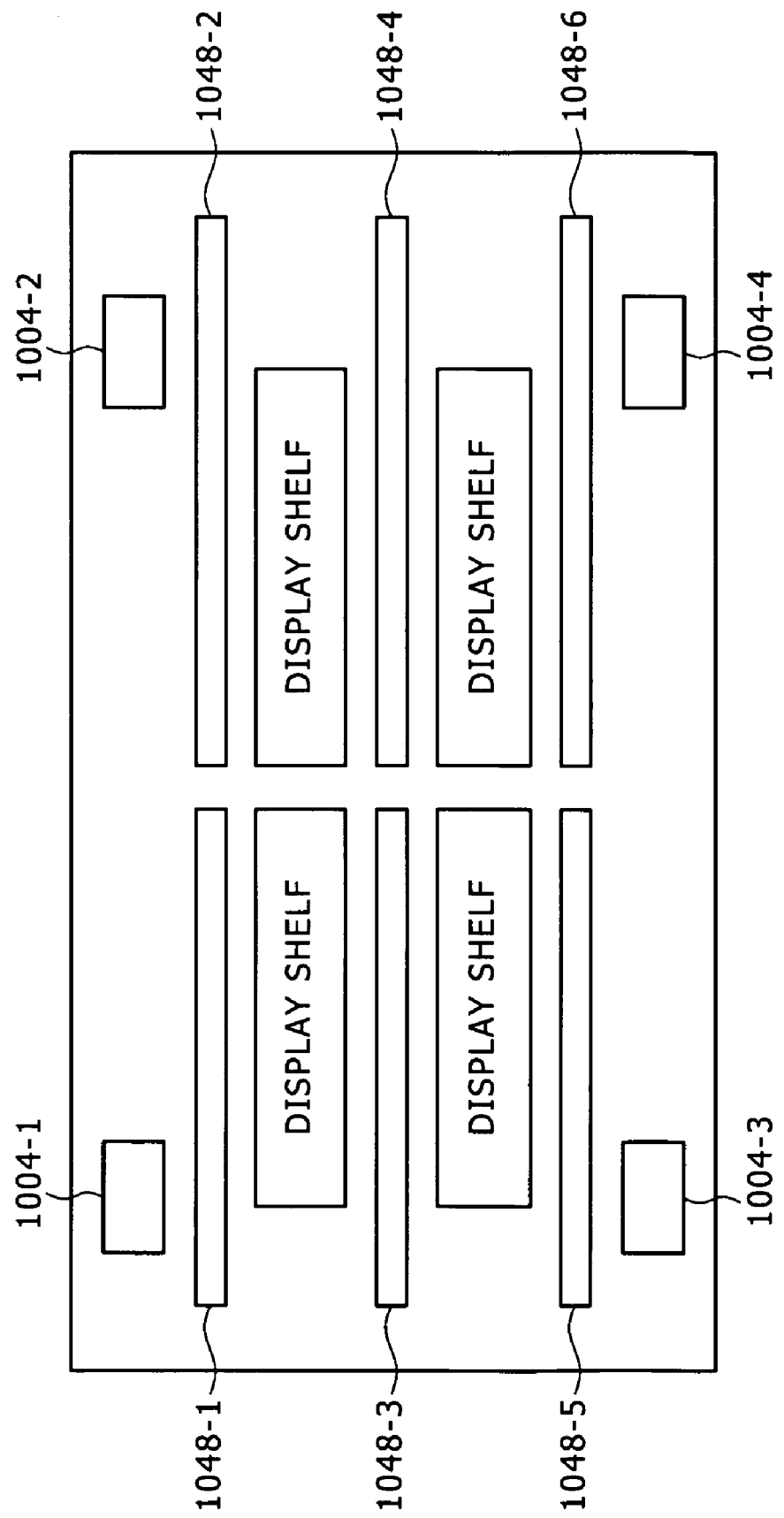
FIG. 13 is a view showing a layout of signal electrodes installed in a shop.

FIG. 13 shows in plan a layout of selection panels 1004 and signal electrodes 1048 of the transmission device 1008 installed in a shop. In FIG. 13, selection panels 1004-1 through 1004-4 are disposed at the respective four corners (upper left, upper right, lower left, and lower right corners) of the shop, and signal electrodes 1048-1 through 1048-6 are laid in the floor on both sides of display shelves on which CDs, etc. are displayed. The signal electrodes 1048-1 through 1048-6 are embedded (laid) in the shop floor 1005, as described above. Actually, each of the signal electrodes 1048-1 through 1048-6 may be divided into smaller electrodes each having a size corresponding to a user's foot, so that several tends of signal electrodes are laid in the floor.

With the arrangement shown in FIG. 13, even when a plurality of users move from a selection panel 1004 and walks around in the shop, each of the users can review desired contents because the signal electrodes 1048 perform radio communications with the portable devices of the individual users.

Figure 14:
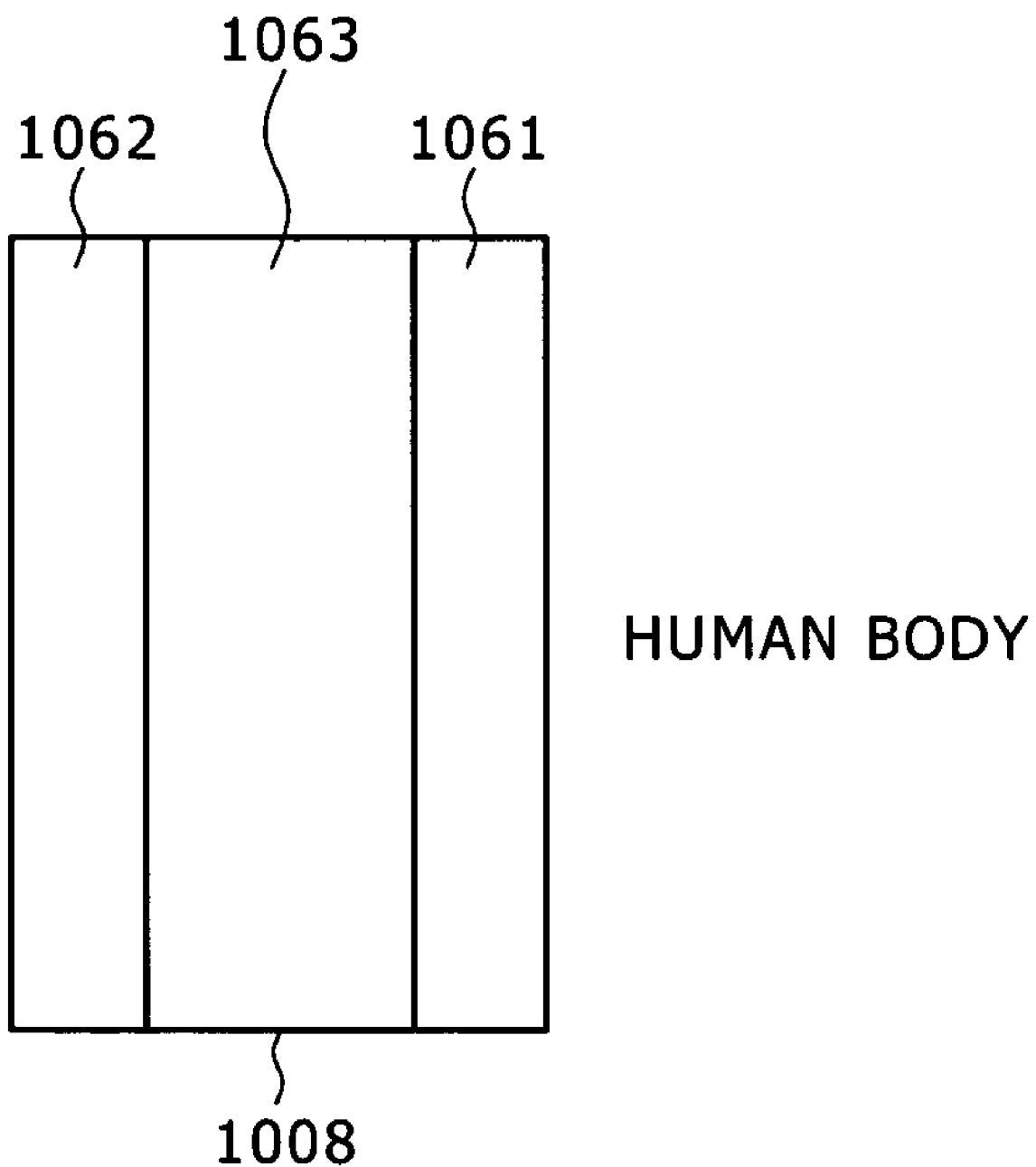
FIG. 14 is a block diagram of a portable device of the contents preview system shown in FIG. 10.

FIG. 14 shows in block form an arrangement of the portable device 1008. The portable device 1008 is of a size small enough to be carried around and is mounted on a speaker of the headphones 1007 for radio communications with the reception unit 1001 or the transmission device 1003. The portable device 1008 includes a signal electrode 1061, a reference electrode 1062, and a controller 1063. The signal electrode 1061 is disposed closely to, e.g., in contact with, a human body that serves as a communication medium, and the reference electrode 1062 is disposed so as to face the space.

For example, the reference electrode 1062 corresponds to the transmission reference electrode 112 or the reception reference electrode 122 shown in FIG. 9, and the signal electrode 1061 to the transmission signal electrode 111 or the reception signal electrode 121 shown in FIG. 9.

The controller 1063 of the portable device 1008 includes a small-size computer, for example, and has physical (hardware) or logical (software) functions corresponding to the transmission/reception switcher 1022 through the communication unit 1026, and also has a storage unit such as an EEPROM (Electrically Erasable Programmable Read Only Memory) for storing information. The storage unit stores in advance an (inherent) ID for specifying the portable device 1008 and payment information representing a method of payment for contents (e.g., a prepaid balance or a credit card number). The storage unit also stores, if necessary, data of contents that the portable device 1008 has received from the transmission device 1003.

Figure 15:
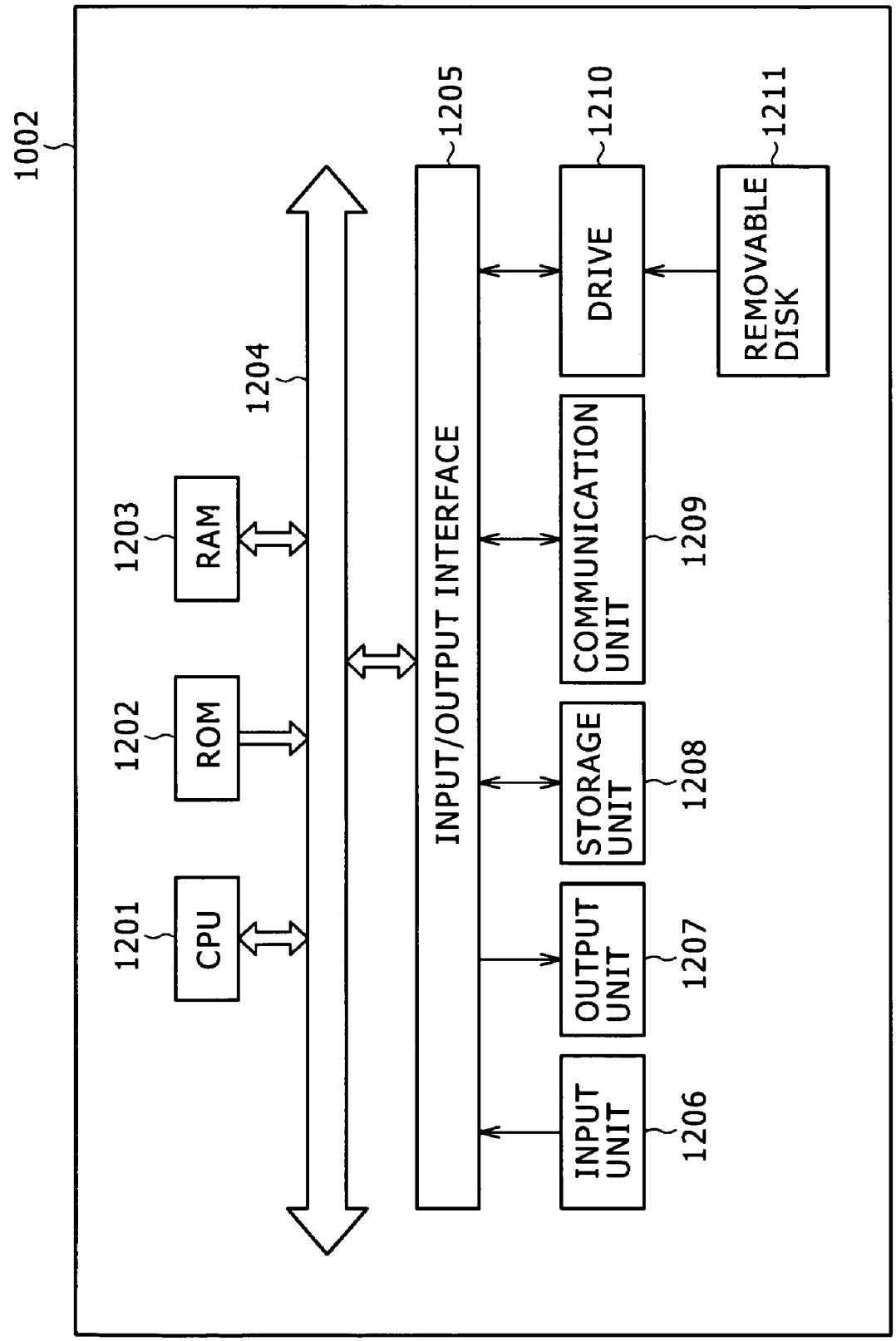
FIG. 15 is a block diagram of a management server of the contents preview system shown in FIG. 10.

FIG. 15 shows in block form an arrangement of the management server 1002. In FIG. 15, a CPU (Central Processing Unit) 1201 performs various processes according to a program stored in a ROM (Read Only Memory) 1202 or a program loaded from a storage unit 1208 into a RAM (Random Access Memory) 1203. The RAM 1203 also stores data required for the CPU 1201 to perform the various processes.

The storage unit 1208 includes an HDD (Hard Disk Drive), for example. The data of contents referred to above are stored in advance in the storage unit 1208.

The CPU 1201, the ROM 1202, and the RAM 1203 are connected to each other through a bus 1204. An input/output interface 1205 is also connected to the bus 1204.

An input unit 1206 including a keyboard and a mouse, an output unit 1207 including a display unit such as an LCD (Liquid Crystal Display) unit and a speaker, the storage unit 1208 such as a hard disk, and a communication unit 1029 such as a network interface card such as a modem or a LAN card are connected to the input/output interface 1205. The communication unit 1209 performs communication processes through a network such as the Internet.

A drive 1210 is also connected to the input/output interface 1205. A removable medium 1211 such as a magnetic disk, an optical disk, a magnetooptical disk, or a semiconductor memory is mounted in the drive 1210. A computer program read from the removable medium 1211 by the drive 1210 is installed in the storage unit 1208.

A contents reviewing process performed by the contents preview system 1000 shown in FIG. 10 will be described below with reference to a flowchart shown in FIG. 16. The contents reviewing process is performed when the user 1010 operates the selection panel 1004 in the shop.

In step S101, the reception unit 1001 carries out a contents identifying process to identify contents that the user 1010 is desirous of reviewing.

Details of a contents identifying process 1, which is an example of the contents identifying process in step S101 shown in FIG. 16, will be described below with reference to a flowchart shown in FIG. 17.

In step S121, the electrode switcher 1021 of the reception unit 1001 switches conduction states of the signal electrodes 1028 disposed on the selection panel 1004 in association with the buttons, e.g., successively turns on and off the signal electrodes 1028.

In step S122, the controller 1025 determines whether the reception unit 1001 can communicate with the portable device 1008 owned by the user 1010 or not. For example, when the reception unit 1001 sends a polling signal at given time intervals and receives a response to the polling signal from the portable device 1008 through a signal electrode that is currently turned on (conducted), it is judged that the reception unit 1001 can communicate with the portable device 1008. Then, control goes to step S123. If it is judged that the reception unit 1001 cannot communicate with the portable device 1008, then control goes back to step S121.

In step S123, the controller 1025 identifies contents corresponding to the signal electrode (i.e., the button) through which the reception unit 1001 can communicate with the portable device 1008 as judged in step S122. For example, if the user 1010 touches the button B1, then the reception unit 1001 can communicate with the portable device 1008 through the signal electrode 1028-1, and the controller 1025 identifies contents of the title T1 corresponding to the signal electrode 1028-1 (the button B1), e.g., an ID of the contents of the title T1.

Figure 16:
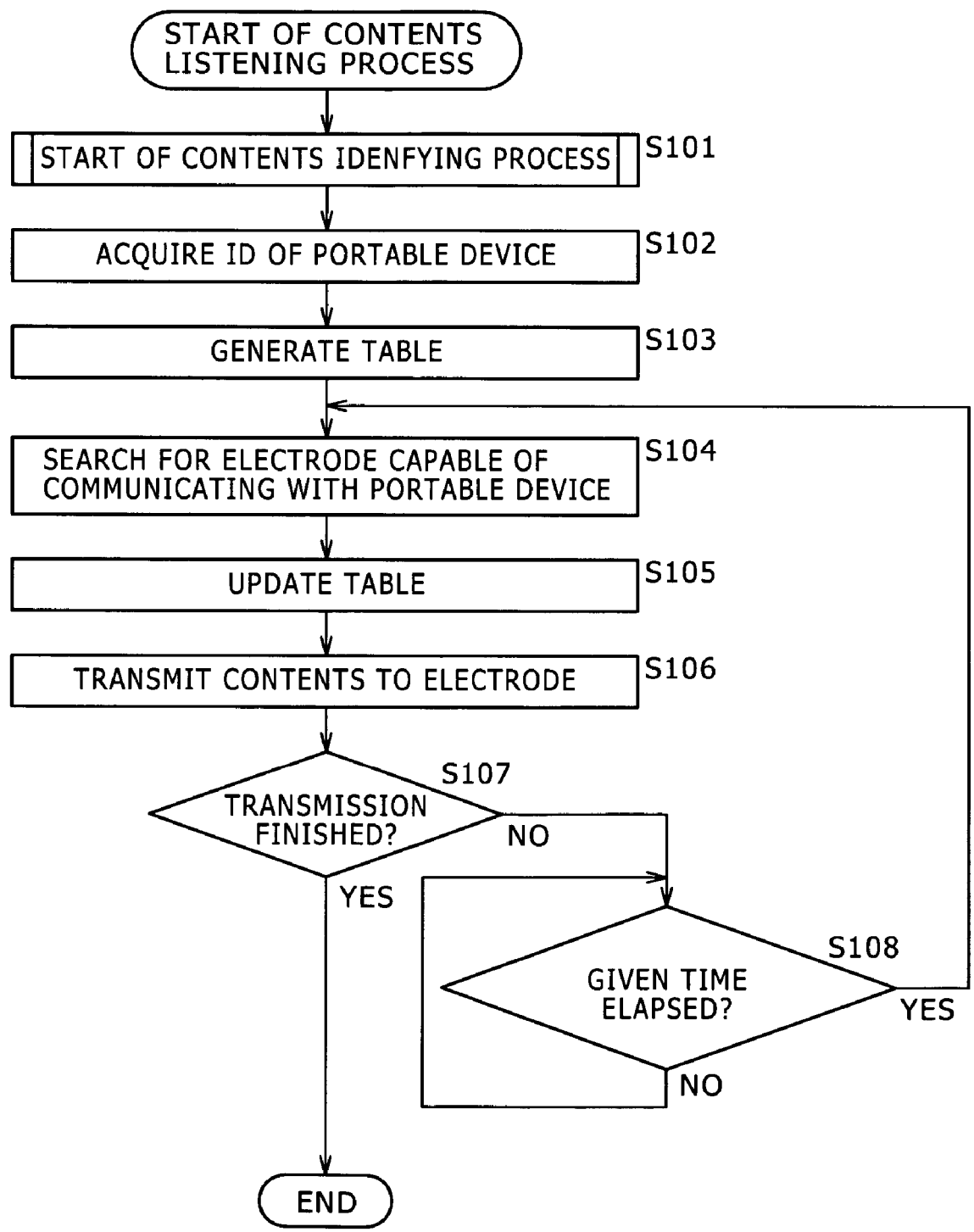
FIG. 16 is a flowchart of a contents preview process.

In FIG. 16, control goes from step S101 to step S102 in which the controller 1025 communicates with the portable device 1008 through the signal electrode (i.e., the signal electrode 1028-1 in the above example), and reads information from the portable device 1008. For example, the controller 1025 reads a device ID inherent in the portable device 1008. The device ID may not necessarily be a unique ID that is assigned to the portable device 1008, but may be an ID that is dynamically assigned from the reception unit 1001 to the portable device 1008 insofar as it is capable of accurately identifying the portable device 1008 in the shop.

The contents (contents ID) identified in step S101 and the ID of the portable device 1008 acquired in step S102 are transmitted from the communication unit 1026 to the management server 1002.

In step S103, the management server 1002 generates, in the RAM 1203 for example, a table associating the contents (contents ID) identified in step S101 with the ID of the portable device 1008 acquired in step S102.

Figures 17, 18:
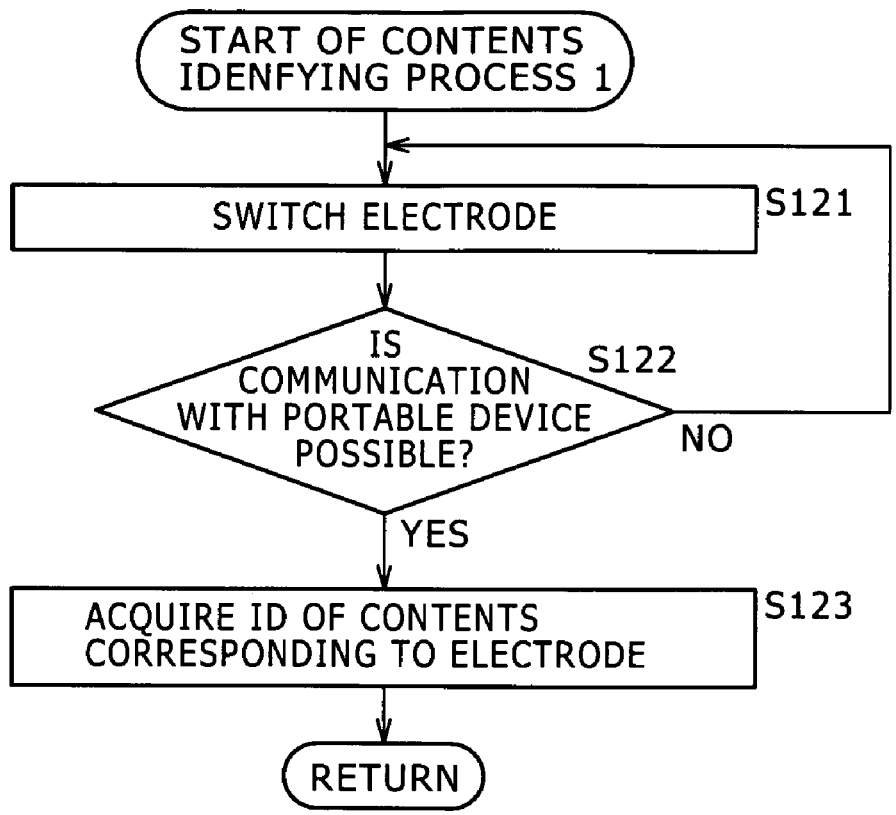
FIG. 17 is a flowchart of a contents identifying process 1.
FIG. 18 is a diagram showing a table generated by the management server.

For example, the management server 1002 generates a table shown in FIG. 18. As shown in FIG. 18, the device ID (the ID of the portable device 1008) and the contents ID are associated with each other. In the example shown in FIG. 18, a device ID "12345678" and a contents ID "1001" (e.g., contents of the title T1) are associated with each other, and a device ID "98765432" and a contents ID "3001" (e.g., contents of the title T3) are associated with each other. Electrode IDs are also shown as being described in the table. However, since those electrode IDs are described in steps S104, S105, they are not yet described in step S103.

In step S104 shown in FIG. 16, the transmission device 1003 acquires information of the table generated by the management server in step S103 to search for signal electrodes that are capable of communicating with the portable device 1008. At this time, the transmission/reception switcher 1042 switches conduction states of the signal electrodes 1048-1, 1048-2, . . . placed in the shop floor, e.g., successively turns on and off the signal electrodes to search for signal electrodes that are capable of communicating with the portable device 1008.

A signal electrode 1048 that can communicate with the portable device 1008 can be determined by determining whether the portable device 1008 has responded to a polling signal sent from the signal electrode 1048 or not. The portable device 1008 sends its own ID together with the polling response to the transmission device 1003 through the signal electrode 1048. Alternatively, the portable device 1008 may send a polling command (or its device ID) and receive a response from the signal electrode 1048. In this manner, the transmission device 1003 can search for and identify a signal electrode that can communicate with the portable device 1008 which corresponds to a device ID described in the table. Information of signal electrodes, i.e., IDs of signal electrodes, which are searched for in step S104 is sent from the communication unit 1046 to the management server 1002.

In step S105, the management server 1002 updates the table based on the IDs of signal electrodes that have been searched for in step S104. At this time, the information of the electrode IDs is described in the table shown in FIG. 18. In FIG. 18, an electrode ID "A1" (e.g., the ID of the signal electrode 1048-1) is described in association with the device ID "12345678" and the contents ID "1001", and an electrode ID "B2" (e.g., the ID of the signal electrode 1048-4) is described in association with the device ID "98765432" and the contents ID "3001".

In step S106, the transmission device 1003 acquires information of the table updated in step S105 from the management server 1002, acquires the data of the contents corresponding to the contents IDs described in the table from the management server 1002, and sends signals corresponding to the data of the contents to the signal electrodes which correspond to the electrode IDs described in the table.

According to the example shown in the table, the controller 1045 receives the data of the contents corresponding to the contents IDs "1001", "3001" from the management server 1002 through the communication unit 1046. The controller 1045 then controls the signal generator 1043 to generate signals corresponding to the data of the contents, and controls the electrode switcher 1041 to send the signal corresponding to the data of the contents ID "1001" to the signal electrode 1048-1 (the electrode ID "A1") and also to send the signal corresponding to the data of the contents ID "3001" to the signal electrode 1048-4 (the electrode ID "B2").

In this manner, the user who owns the portable device with the device ID "12345678" can review the contents of the title T1 (the contents ID "1001"), and the user who owns the portable device with the device ID "98765432" can review the contents of the title T3 (the contents ID "3001").

After step S106, the transmission device 1003 determines whether the transmission of the contents is finished or not in step S107. If it is judged that the transmission of the contents is not finished, then control goes to step S108 which determines whether a predetermined period of time, e.g., 10 seconds, has elapsed or not. Control waits in step S108 until the predetermined period of time has elapsed.

If it is judged that the predetermined period of time has elapsed in step S108, then control goes back to step S104 to repeat the processing from step S104. Specifically, if a user moves in the shop, then it is necessary to change the signal electrode 1048 through which contents are transmitted. Therefore, the transmission device 1003 and the management server 1002 update the information of electrode IDs capable of communicating with the portable device carried by the user, in the table at predetermined time intervals.

If it is judged that the transmission of the contents is finished in step S107, then the contents reviewing process shown in FIG. 16 is terminated.

A process that is performed by the portable device 1008 when the contents reviewing process shown in FIG. 16 is carried out will be described below with reference to a flowchart shown in FIG. 19.

In step S161, the portable device 1008 sends a polling signal at given time intervals and determines whether there is a response to the polling signal from the signal electrode 1048 of the transmission device 1003 or not. Control waits in step S161 until it is judged that there is a response to the polling signal. If it is judged that there is a response to the polling signal in step S161, then control goes to step S162.

In step S162, the portable device 1008 sends its own ID to the transmission device 1003. The management server 1002 then generates a table as described above with reference to FIG. 18.

In step S163, the portable device 1008 receives information (a signal of contents) sent from the signal electrode 1048 of the transmission device 1003. The received signal of contents is output from the portable device 1008 to the headphones 1007, which outputs an audio signal of the contents.

Actually, it is difficult to send uninterrupted data. Therefore, the data of received contents may be buffered, and when a certain amount of data is received, the data may start to be demodulated, and headphones 1007 may output an audio signal of the contents. When the buffered amount of data is reduced, the portable device 1008 may send a request to transmit contents to the transmission device 1003.

In step S164, the portable device 1008 determines whether the reception of contents is finished or not. If it is judged that the reception of contents is not finished, then control goes back to step S161 to repeat the processing from step S161. Specifically, if a user moves in the shop, then it is necessary to change the signal electrode 1048 through which contents are transmitted. Therefore, a response to the polling signal from the signal electrode 1048 is repeated at given time intervals to update the information of electrode IDs in the table shown in FIG. 18.

Figure 19:
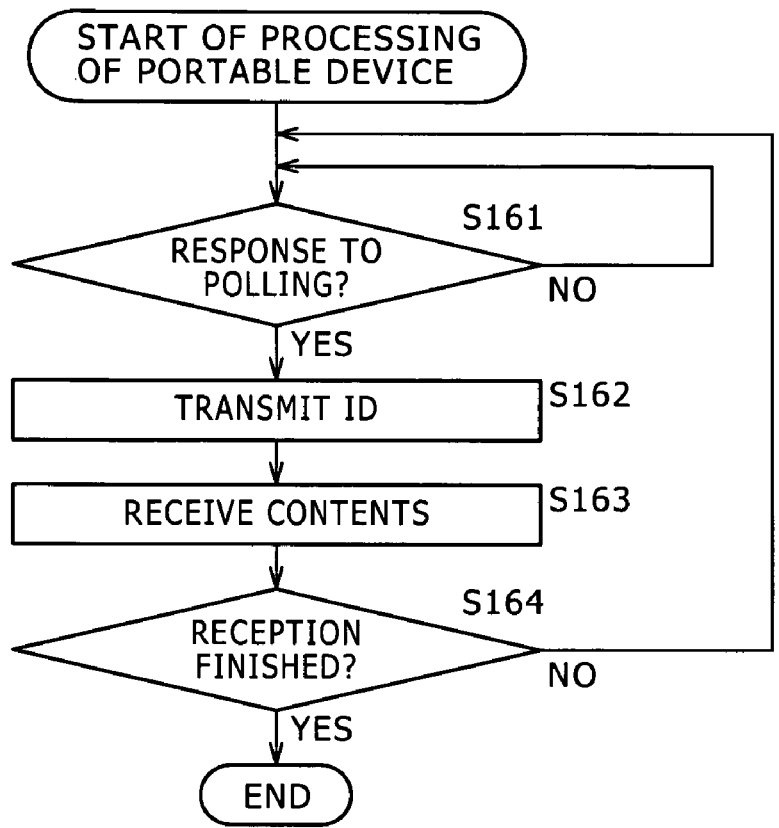
FIG. 19 is a flowchart of a process performed by the portable device.

If it is judged that the reception of contents is finished in step S164, then the process shown in FIG. 19 is put to an end.

In this manner, the user reviews contents using the contents preview system 1000. Since information of contents is sent by way of radio communications between the portable device 1008 and the signal electrode, the headphones 1007 outputs an audio signal of the contents that the user 1010 wants to review wherever the user 1010 may move in the shop. Therefore, even if there are many users who want to review contents in the shop, each of the users can freely move in the shop after having operated buttons on the selection panel 1004, and a new user who wants to review contents does not need to wait until a user who is reviewing the same contents finishes reviewing the contents. The contents preview system 1000 is highly convenient for users to use.

Furthermore, as radio communications between the portable device 1008 and the signal electrode are performed through a human body (the user 1010) as the communication medium, devices required for reviewing contents, such as the headphones 1007, may be small in size and inexpensive to construct.

In the above description, the user 1010 touches buttons (signal electrodes) on the selection panel 1004 to identify contents. However, the user 1010 may identify contents according to other processes.

For example, the selection panel 1004 may be replaced with buttons which are combined with signal electrodes and mounted on display shelves or display panels. Alternatively, the selection panel 1004 may be free of signal electrodes and may have keys or bar-code readers for entering characters and symbols to identify contents.

Further alternatively, a device similar to the portable device 1008 may be mounted on a package of contents, and when the user 1010 holds the package by hand, the portable device 1008 performs radio communications with the device on the package through the human body (the user 1010) in the manner described above with reference to FIGS. 2 through 9, so that contents IDs are stored in the memory of the portable device 1008. When the user 1010 touches the signal electrode 1028, the portable device 1008 may send a request to transmit contents, together with a contents ID, to the reception unit 1001.

Figure 20:
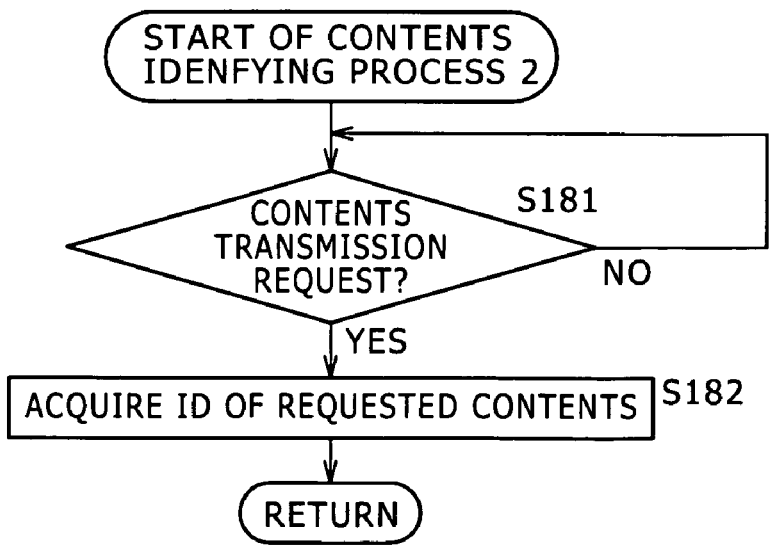
FIG. 20 is a flowchart of a contents identifying process 2.

Details of a contents identifying process 2 according to the above further alternative, which is an example of the contents identifying process in step S101 shown in FIG. 16, will be described below with reference to a flowchart shown in FIG. 20. In step S181, the controller 1025 of the reception unit 1001 determines whether there is a request to transmit contents from the portable device 1008 owned by the user 1010 or not. Control waits in step S181 until it is judged that there is a request to transmit contents. If it is judged that there is a request to transmit contents in step S181, then control goes to step S182.

In step S182, the controller 1025 acquires a contents ID from the portable device 1008.

When the user 1010 holds the package of the contents of the title T1 displayed on a display shelf in the shop and touches the signal electrode 1028 laid in the floor near the display shelf, the contents of the title T1 (e.g., the ID of the contents of the title T1) are identified.

A plurality of content may be selected at one time by the user. In this case, all the contents IDs of the selected contents are stored in the memory of the portable device 1008, and the portable device 1008 outputs requests to transmit the contents successively or at once, so that the contents corresponding to the contents IDs may successively be reproduced.

In the above embodiments, the user reviews contents free of charge. However, the contents review system 1000 may be used to let the user to review contents for a fee or let the user to purchase contents.

A contents purchasing process which employs the contents review system 1000 will be described below with reference to a flowchart shown in FIG. 21.

In step S301, the reception unit 1001 performs a contents identifying process. The contents identifying process is identical to the contents identifying process described above with reference to FIG. 17 or 20, and will not be described in detail below.

After step S301, control goes to step S302 in which the controller 1025 communicates with the portable device 1008 through the signal electrode 1028 and reads information from the portable device 1008. At this time, the controller 1025 reads the device ID inherent in the portable device 1008, for example.

The contents (contents ID) identified in step S301 and the ID of the portable device 1008 acquired in step S302 are transmitted from the communication unit 1026 to the management server 1002, and then through the management server 1002 to the transmission device 1003.

In step S303, the transmission device 1003 acquires information of device IDs from the management server 1002 to search for signal electrodes that are capable of communicating with the portable device 1008. At this time, the transmission/reception switcher 1042 switches conduction states of the signal electrodes 1048-1, 1048-2, . . . placed in the shop floor, e.g., successively turns on and off the signal electrodes to search for (identify) signal electrodes that are capable of communicating with the portable device 1008.

A signal electrode 1048 that can communicate with the portable device 1008 can be determined by determining whether the portable device 1008 has responded to a polling signal sent from the signal electrode 1048 or not. The portable device 1008 sends its own ID together with the polling response to the transmission device 1003 through the signal electrode 1048. In this manner, the transmission device 1003 can identify a signal electrode that can communicate with the portable device 1008 which corresponds to the device ID acquired in step S302. Information of signal electrodes, i.e., IDs of signal electrodes, which are searched for in step S303 is sent from the communication unit 1046 to the management server 1002.

In step S304, the management server 1002 generates, in the RAM 1203, for example, a table associating the contents (contents ID) identified in step S301 with the ID of the portable device 1008 acquired in step S302 and the electrode ID searched in step S303. In this manner, a table similar to the table described above with reference to FIG. 18 is generated.

Figure 22:
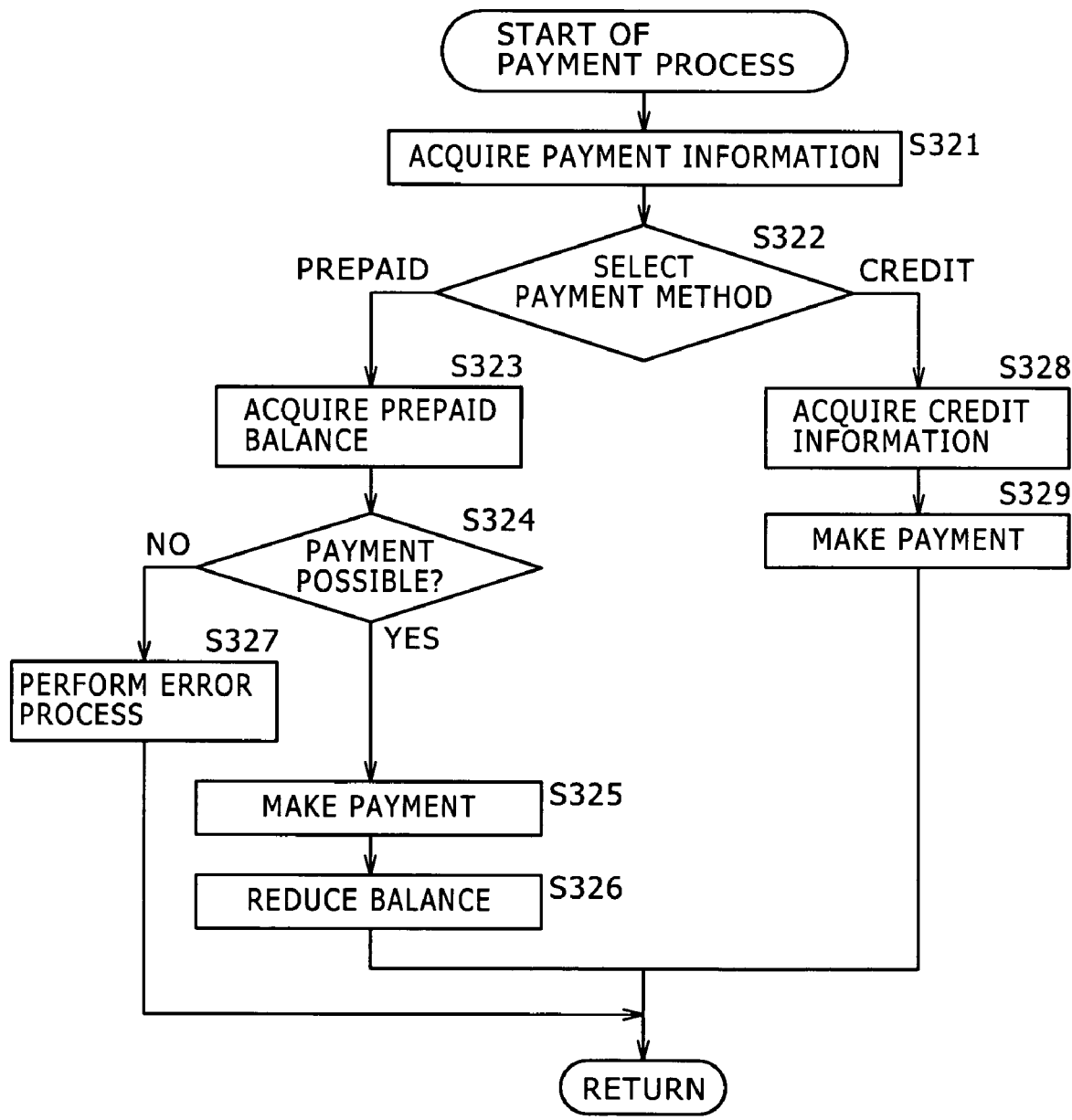
FIG. 22 is a flowchart of a payment process.

In step S305, the management server 1002 performs a payment process, to be described later with reference to FIG. 22. The storage unit 1208 of the management server 1002 stores amounts of money (payments to be made to purchase contents) registered in advance for respective contents IDs. The payment for purchased contents is made in step S305.

Details of the payment process in step S305 shown in FIG. 21 will be described below with reference to a flowchart shown in FIG. 22. The payment process is executed by the management server 1002 which controls the reception unit 1001 while communicating with the reception unit 1001 through a network or the like.

In step S321, the management server 1002 acquires payment information of the portable device 1008. The portable device 1008 stores in advance payment information representing methods of payment with respect to charges for using contents. The management server 1002 acquires the payment information by controlling the reception unit 1001.

In step S322, the management server 1002 selects a payment method based on the payment information acquired in step S321. In the present example, it is assumed that there are two methods of payment with respect to charges for using contents, i.e., a deduction from a prepaid balance and a credit card payment.

If it is judged in step S322 that the selected method of payment is a reduction from the prepaid balance, then control goes to step S323. In step S323, the management server 1002 acquires the prepaid balance included in the payment information acquired in step S321.

In step S324, the management server 1002 determines whether the charge for the contents can be paid or not based on the prepaid balance acquired in step S323. If the prepaid balance is smaller than the charge for the contents, then it is judged that the charge for the contents cannot be paid, and control goes to step S327 in which an error process is performed. If the prepaid balance is equal to or greater than the charge for the contents, then it is judged that the charge for the contents can be paid, and control goes to step S325.

In step S325, the management server 1002 makes a payment.

In step S326, the management server 1002 subtracts the charge for the contents paid in step S325 from the prepaid balance of the portable device 1008.

Step S326 may be executed before step S325, and hence step 325 may be executed after step S326.

If it is judged in step S322 that the selected method of payment is a credit card payment, then control goes to step S328. In step S328, the management server 1002 acquires credit card information such as a credit card number included in the payment information acquired in step S321.

In step S329, the management server 1002 makes a payment. The credit card information acquired in step S328 and information as to the charge for the contents are sent to a payment server connected through the network, and the payment server makes a payment.

The payment process is performed as described above.

Figure 21:
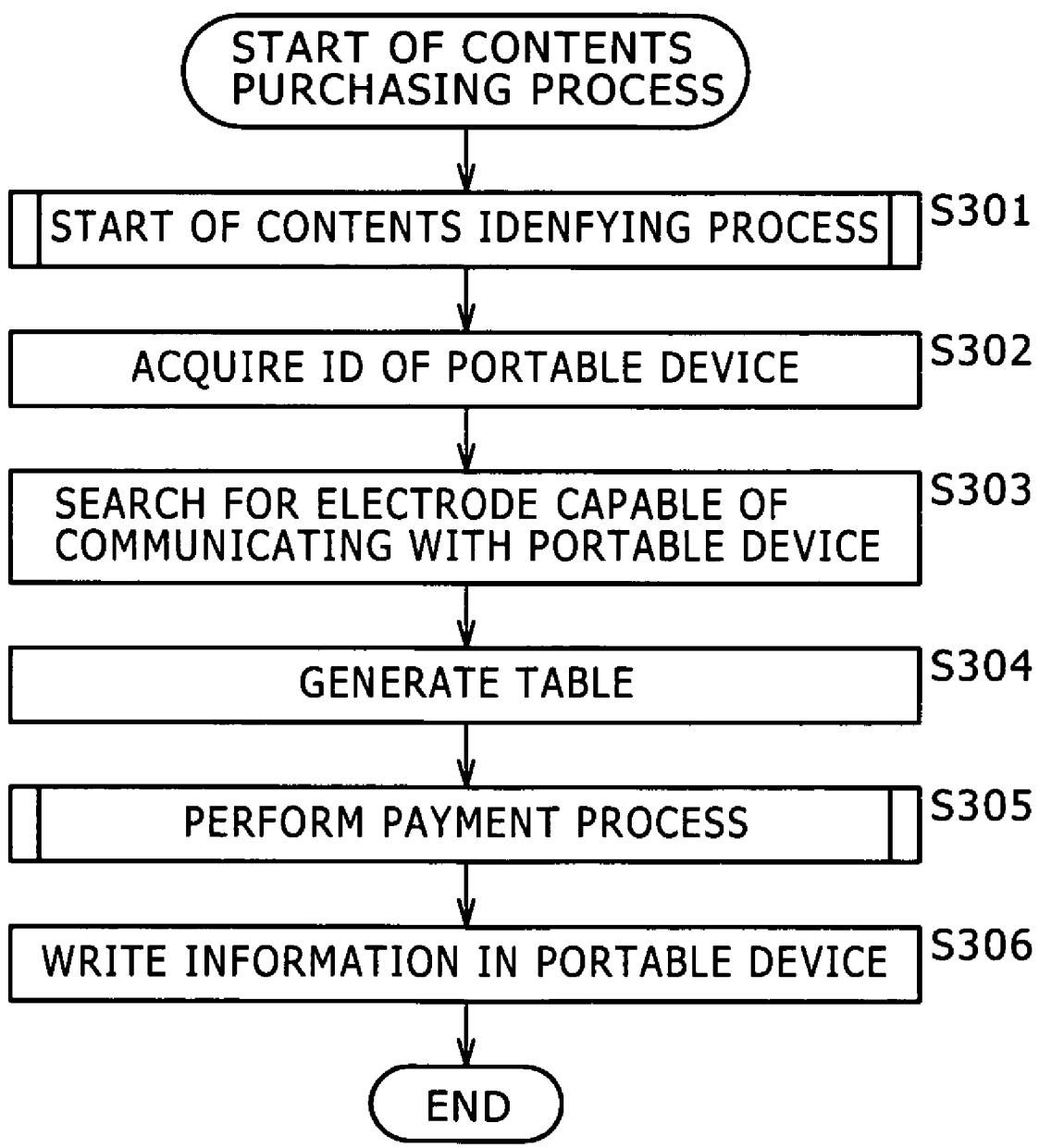
FIG. 21 is a flowchart of a contents purchasing process.

After step S305 shown in FIG. 21, the management server 1002 communicates with the transmission device 1003 through the network and controls the transmission device 1003 to convert the data of the contents identified in step S301 into a signal and send the signal from the signal electrode 1048 searched for in step S303 to the portable device 1008, which stores the signal, i.e., the data of the contents.

To confidentialize the data of contents to be transmitted, i.e., to prevent an unauthorized user other than the purchaser from acquiring the data of contents, the data of contents may be encrypted according to a predetermined algorithm. If the data of contents are encrypted, then the management server 1002 sends information of a key for decrypting the encrypted data to the portable device 1008, which decrypts the encrypted data with the key and reproduces the data of the contents. The information of the key may be transmitted together with the data of the contents, or may be transmitted separately after it is confirmed that a credit card payment has been made.

Figure 23:
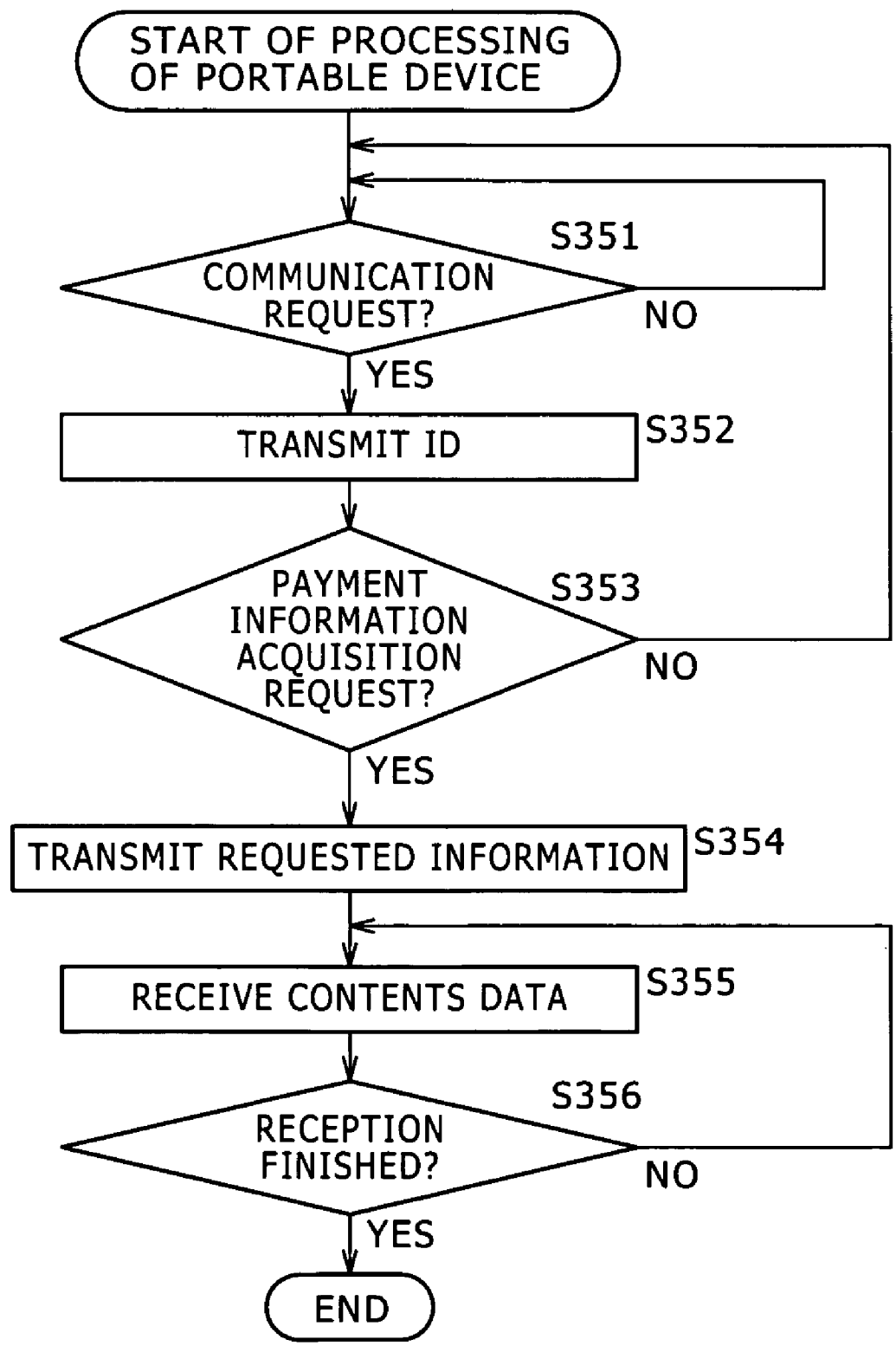
FIG. 23 is a flowchart of another process performed by the portable device.

A process performed by the portable device 1008 when the above contents purchasing process is performed will be described below with reference to a flowchart shown in FIG. 23.

In step S351, the portable device 1008 determines whether it has received a communication request from the reception unit 1001 or the transmission device 1003 or not. Control waits in step S351 until it is judged that the portable device 1008 has received a communication request.

In step S352, the portable device 1008 sends its own device ID. After step S352, control goes to step S353 in which the portable device 1008 determines whether there is a request to acquire payment information or not. If it is judged that there is a request to acquire payment information, then the portable device 1008 sends payment information in step S354.

If it is judged in step S353 that there is not a request to acquire payment information, control goes back to step S351.

In step S355, the portable device 1008 receives a signal corresponding to the data of the contents transmitted from the transmission device 1003 through the signal electrode 1048, thus acquiring the data of the contents. The portable device 1008 determines whether the reception of the data of the contents is finished or not in step S356. The portable device 1008 continues to receive the signal corresponding to the data of the contents until it is judged that the reception of the data of the contents is finished.

The above process is performed by the portable device 1008 when the contents purchasing process is performed.

The user can thus purchase contents or review contents for a fee, using the contents review system 100.

In the above embodiments, the transmission device has a plurality of signal electrodes 1048 laid in the floor of the shop. However, the transmission device may have a single sufficiently large signal electrode or a small number of signal electrodes. According to such a modification, since a plurality of users (portable devices) may be present over one signal electrode 1048, the transmission device 1003 communicates with each of the portable devices according to a frequency-division multiplex communication process, for example. Specifically, prior to actual communications, the transmission device 1003 assigns frequency bands for use in communications with the portable devices from a plurality of frequency bands that are available for communications, and communicates with the portable devices in the respective assigned frequency bands. Therefore, the transmission device 1003 can simultaneously communicate with the portable devices using the single signal electrode 1048.

In the above embodiments, the contents review system 100 has been described with respect to applications for reviewing contents such as music pieces recorded on CDs. However, the principles of the present invention are also applicable to a system for reviewing contents such as images recorded on DVDs (Digital Versatile Disks).

The above processing sequence may be performed by either hardware or software. If the processes described above are to be performed according to a software program, then the software program is installed from a network or a recording medium into a computer of dedicated hardware components or a general-purpose computer which is capable of performing various functions according to programs installed therein.

If the processing sequence is performed by software, then a software program is installed from a network such as the Internet or a recording medium such as a removable medium.

The recording medium may include a removable recording medium such as a magnetic disk (including a floppy disk (registered trademark)), an optical disk (including a CD-ROM (Compact Disk-Read Only Memory), and a DVD (Digital Versatile Disk)), a magneto-optical disk (including an MD (Mini-Disk) (registered trademark)), or a semiconductor memory, which stores the program and is distributed to provide the program to the user, or may include a ROM or a hard disk included in a storage unit, which stores the program and is incorporated in a device, and provided to the user.

The steps of the processes described above include processes which are carried out chronologically in the order described above and processes which are carried out concurrently or individually, rather than chronologically.

Although certain preferred embodiments of the present invention have been shown and described in detail, it should be understood that various changes and modifications may be made therein without departing from the scope of the appended claims.

What is claimed is:

1. An information processing system comprising:
    a terminal carried by a user; and
    an information processing device for communicating with said terminal;
    said information processing device comprising:
        a first signal electrode for transmitting or receiving a signal through a communication medium in communications with said terminal;
        a first reference electrode for obtaining a reference point for determining an output value of said signal;
        an identifying section for identifying data to be transmitted to said terminal;
        an acquiring section for acquiring information for identifying said terminal;
        a searching section for searching for said first signal electrode which is capable of communicating with said terminal corresponding to the information acquired by said acquiring section; and
        a transmitting section for transmitting a signal corresponding to the data identified by said identifying section from said first signal electrode searched for by said searching section to said terminal;
    said terminal comprising:
        a second signal electrode for transmitting or receiving a signal through a communication medium in communications with said information processing device;
        a second reference electrode for obtaining a reference point for determining an output value of said signal;
        a stored information transmitting section for transmitting information stored therein as a signal to said information processing device; and
        a receiving section for receiving the signal transmitted from said information processing device.

2. An information processing device for communicating with a terminal carried by a user, comprising:
    a signal electrode for transmitting or receiving a signal through a communication medium in communications with said terminal;
    a reference electrode for obtaining a reference point for determining an output value of said signal;
    an identifying section for identifying data to be transmitted to said terminal;

an acquiring section for acquiring information for identifying said terminal;

a searching section for searching for said signal electrode which is capable of communicating with said terminal corresponding to the information acquired by said acquiring section; and a transmitting section for transmitting a signal corresponding to the data identified by said identifying section from said signal electrode searched for by said searching section to said terminal.

3. The information processing device according to claim 2, wherein said signal electrode is electrostatically coupled to said communication medium more intensively than said reference electrode, and transmits or receives a signal corresponding to a potential difference developed between said signal electrode and said reference electrode.

4. The information processing device according to claim 2, wherein said identifying section searches for a signal electrode capable of communicating with said terminal among a plurality of signal electrodes corresponding to a plurality of data, and identifies said data based on the signal electrode which has been searched for.

5. The information processing device according to claim 2, wherein said identifying section identifies said data based on a signal transmitted from said terminal.

6. The information processing device according to claim 5, wherein the signal electrode for communicating with said terminal is mounted on an object corresponding to said data, and said data is identified based on the signal transmitted from said terminal to said identifying section based on the signal transmitted from the signal electrode mounted on said object when said user touches the object corresponding to said data.

7. The information processing device according to claim 2, further comprising:

a generating section for generating a table associating the data identified by said identifying section with the information acquired by said acquiring section for identifying said terminal and the signal electrode searched for by said searing section and capable of communicating with said terminal;

wherein said transmitting section transmit the signal corresponding to said data based on said table generated by said generating section.

8. The information processing device according to claim 7, wherein said searching section searches for a signal electrode capable of communicating with said terminal each time a preset time elapses, and said table is updated based on information with respect to the signal electrode which has been searched for.

9. The information processing device according to claim 2, wherein said data comprises audio data as contents, and said terminal is incorporated in headphones worn by said user.

10. The information processing device according to claim 9, wherein the signal electrode from which the signal corresponding to said data is transmitted to said terminal by said transmitting section is embedded in a floor of a shop for selling said contents, said communication medium comprises a human body, and said searching section searches the signal electrode embedded in a position where said user stands, as the signal capable of communicating with said terminal.

11. The information processing device according to claim 9, wherein said data is encrypted and transmitted to said terminal.

12. A method of processing information in an information processing device having a signal electrode for transmitting or receiving a signal through a communication medium, and a reference electrode for obtaining a reference point for determining an output value of said signal, wherein said information processing device communicates with a terminal carried by a user based on the signal transmitted or received by said signal electrode, said method comprising the steps of:

identifying data to be transmitted to said terminal;

acquiring information for identifying said terminal;

searching for said signal electrode which is capable of communicating with said terminal corresponding to the information acquired in said step of acquiring; and transmitting a signal corresponding to the data identified in said step of identifying from the signal electrode searched for in said step of searching for to said terminal.

13. A non-transitory computer readable medium having a program for controlling an information processing device to process information, said information processing device having a signal electrode for transmitting or receiving a signal through a communication medium, and a reference electrode for obtaining a reference point for determining an output value of said signal, wherein said information processing device communicates with a terminal carried by a user based on the signal transmitted or received by said signal electrode, said program enabling a computer to perform a process comprising the steps of:

controlling identification of data to be transmitted to said terminal;

controlling acquisition of information for identifying said terminal;

controlling searching for of said signal electrode which is capable of communicating with said terminal corresponding to the information acquired in said step of controlling acquisition; and controlling transmission of a signal corresponding to the data identified in said step of controlling identification from the signal electrode searched for in said step of controlling searching for to said terminal.

14. A recording medium recording therein a program for controlling an information processing device to process information, said information processing device having a signal electrode for transmitting or receiving a signal through a communication medium, and a reference electrode for obtaining a reference point for determining an output value of said signal, wherein said information processing device communicates with a terminal carried by a user based on the signal transmitted or received by said signal electrode, said program enabling a computer to perform a process comprising the steps of:

controlling identification of data to be transmitted to said terminal;

controlling acquisition of information for identifying said terminal;

controlling searching for of said signal electrode which is capable of communicating with said terminal corresponding to the information acquired in said step of controlling acquisition; and controlling transmission of a signal corresponding to the data identified in said step of controlling identification from the signal electrode searched for in said step of controlling searching for to said terminal.

15. An information processing device for being carried by a user for communicating with another information processing device, comprising:

a signal electrode for transmitting or receiving a signal through a communication medium in communications with said other information processing device;

a reference electrode for obtaining a reference point for determining an output value of said signal;

a stored information transmitting section for transmitting information stored therein as a signal to said other information processing device; and a receiving section for receiving a signal transmitted from said other information processing device.

16. The information processing device according to claim 15, wherein said signal electrode is electrostatically coupled to said communication medium more intensively than said reference electrode, and transmits or receives a signal corresponding to a potential difference developed between said signal electrode and said reference electrode.

17. The information processing device according to claim 16, wherein said communication medium comprises a human body, and said information processing device is incorporated in a unit worn by said user.

18. The information processing device according to claim 17, said receiving section receives a signal corresponding to data of contents transmitted from said other information processing device, and the signal received by said receiving section is output to said unit.

19. A method of processing information in an information processing device carried by a user and having a signal electrode for transmitting or receiving a signal through a communication medium to or from another information device, and a reference electrode for obtaining a reference point for determining an output value of said signal, wherein said information processing device communicates with said other information processing device based on the signal transmitted or received by said signal electrode, said method comprising the steps of:

transmitting stored information as a signal to said other information processing device; and receiving a signal transmitted from said other information processing device.

* * * * *